(12) United States Patent
Noguchi

(10) Patent No.: US 10,229,177 B2
(45) Date of Patent: **\*Mar. 12, 2019**

(54) PRODUCT SEARCH APPARATUS, METHOD, AND SYSTEM

(71) Applicant: FUJIFILM Corporation, Tokyo (JP)

(72) Inventor: Yukinori Noguchi, Tokyo (JP)

(73) Assignee: FUJIFILM Corporation, Tokyo (JP)

(\*) Notice: Subject to any disclaimer, the term of this patent is extended or adjusted under 35 U.S.C. 154(b) by 212 days.

This patent is subject to a terminal disclaimer.

(21) Appl. No.: 15/205,403

(22) Filed: Jul. 8, 2016

(65) Prior Publication Data

US 2016/0321334 A1 Nov. 3, 2016

Related U.S. Application Data

(63) Continuation of application No. PCT/JP2015/051242, filed on Jan. 19, 2015.

(30) Foreign Application Priority Data

Feb. 28, 2014 (JP) ................................. 2014-038522

(51) Int. Cl.
*G06F 17/30* (2006.01)
*G06Q 30/06* (2012.01)

(52) U.S. Cl.
CPC .... *G06F 17/30569* (2013.01); *G06F 17/3028* (2013.01); *G06F 17/30268* (2013.01);
(Continued)

(58) Field of Classification Search
CPC .................................................. G06T 7/0079
(Continued)

(56) References Cited

U.S. PATENT DOCUMENTS

2010/0076867 A1 3/2010 Inoue et al.
2010/0287150 A1\* 11/2010 Downum .......... G06F 17/30864
707/706
(Continued)

FOREIGN PATENT DOCUMENTS

JP 08-249353 A 9/1996
JP 09-114853 A 5/1997
(Continued)

OTHER PUBLICATIONS

An Office Action issued by Japanese Patent Office dated Mar. 28, 2017, which corresponds to Japanese patent application No. 2014-038522 with English language translation. Total 6 pages.
(Continued)

*Primary Examiner* — Kim T Nguyen
(74) *Attorney, Agent, or Firm* — Studebaker & Brackett PC

(57) ABSTRACT

A product search apparatus according to a preferred aspect of the present invention includes a physical amount acquisition unit that acquires a physical amount of an image of a specific product from a product database, a first conversion unit that converts the physical amount of the image of the specific product into information indicating a block in a sensibility space, a second conversion unit that converts the information indicating the block in the sensibility space into information indicating a range of a physical amount of an image, a category selection unit that selects a search target category, and a search unit that searches for an image corresponding to the search target category and a block of interest from the product database based on the search target category and the information indicating the range of the physical amount obtained by the second conversion unit.

15 Claims, 24 Drawing Sheets

(52) U.S. Cl.
CPC .. *G06F 17/30598* (2013.01); *G06F 17/30867* (2013.01); *G06Q 30/06* (2013.01); *G06Q 30/0643* (2013.01)

(58) Field of Classification Search
USPC .......................................................... 707/756
See application file for complete search history.

(56) References Cited

U.S. PATENT DOCUMENTS

| | | | |
|---|---|---|---|
| 2011/0078176 A1 | 3/2011 | Hayaishi | |
| 2011/0258149 A1* | 10/2011 | Kanungo | G06F 17/30882 706/12 |
| 2012/0158686 A1* | 6/2012 | Hua | G06F 17/30268 707/706 |
| 2012/0290601 A1* | 11/2012 | Huang | G06K 9/00469 707/769 |
| 2013/0013578 A1* | 1/2013 | Yang | G06F 17/30277 707/706 |
| 2013/0218858 A1* | 8/2013 | Perelman | G06F 17/30867 707/706 |
| 2014/0019431 A1 | 1/2014 | Suleyman et al. | |
| 2014/0093175 A1* | 4/2014 | Morimoto | G06F 17/30554 382/195 |
| 2014/0314313 A1* | 10/2014 | Kennedy | G06K 9/00369 382/165 |
| 2015/0040026 A1* | 2/2015 | Sergunin | H04L 67/22 715/745 |
| 2015/0142566 A1* | 5/2015 | Zhang | G06Q 30/0256 705/14.54 |

FOREIGN PATENT DOCUMENTS

| | | |
|---|---|---|
| JP | 11-232288 A | 8/1999 |
| JP | 2011-070412 A | 4/2011 |

OTHER PUBLICATIONS

International Search Report issued in PCT/JP2015/051242; dated Apr. 14, 2015.
Written Opinion issued in PCT/JP2015/051242; dated Apr. 14, 2015.
Hochin; Image Media and Kansei Retrieval; IEICE Technical report; 2012; pp. 1-6.
Takashi; How to understand sensitive expression by color, quality feel, and design; Image Lab; 2010; pp. 61-71.
Extended European Search Report (EESR) dated Feb. 21, 2017 issued in corresponding EP Appln. No. 15754715.9-1958; 9pp.
Communication Pursuant to Article 94(3) EPC issued by the European Patent Office dated Aug. 3, 2017, which corresponds to European Patent Application No. 15754715.9-1958 and is related to U.S. Appl. No. 15/205,403; 5 pages.
Summons to attend oral proceedings pursuant to Rule 115(1) EPC issued by the European Patent Office dated Jul. 5, 2018, which corresponds to European Patent Application No. 15754715.9-1222 and is related to U.S. Appl. No. 15/205,403.

* cited by examiner

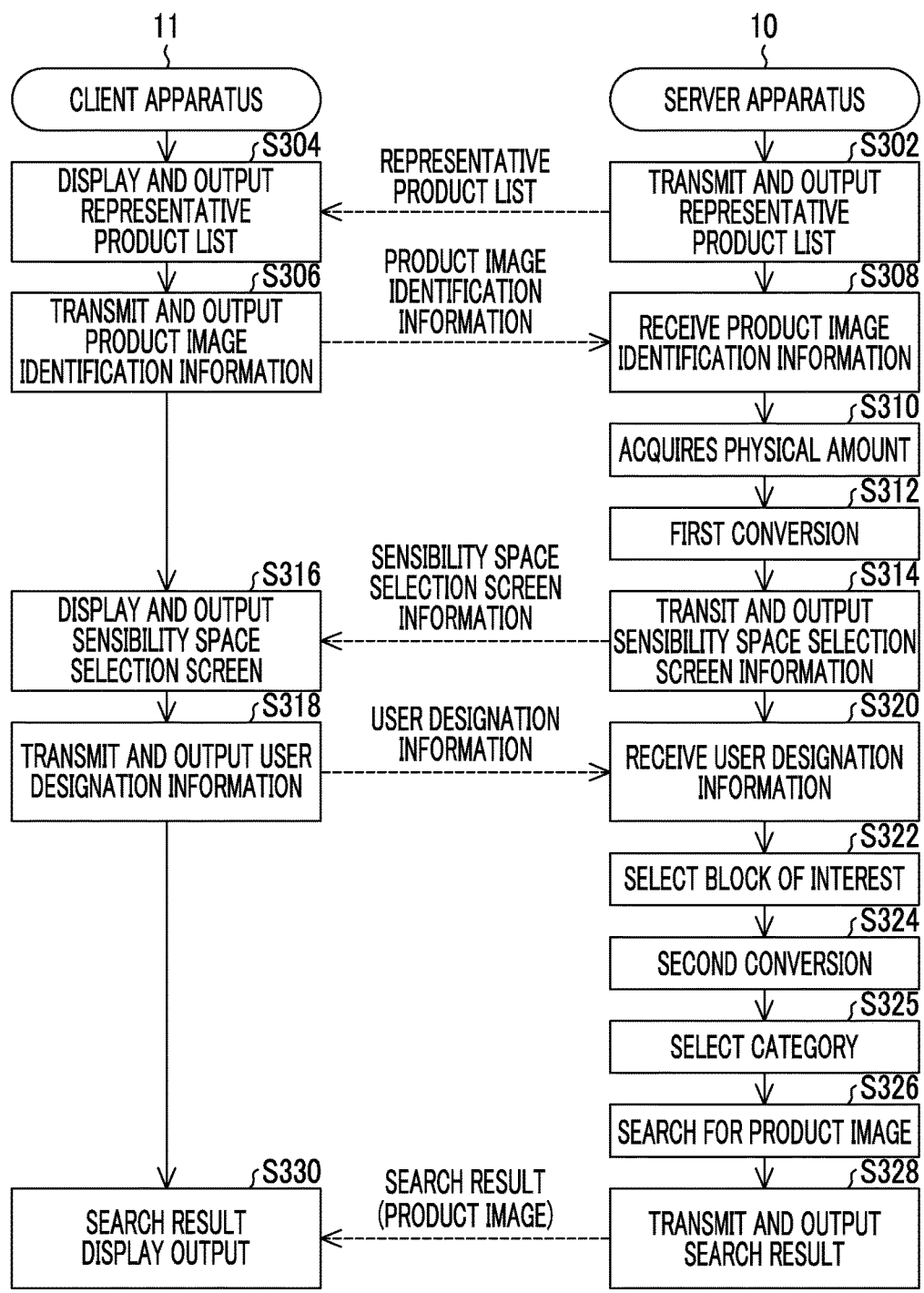

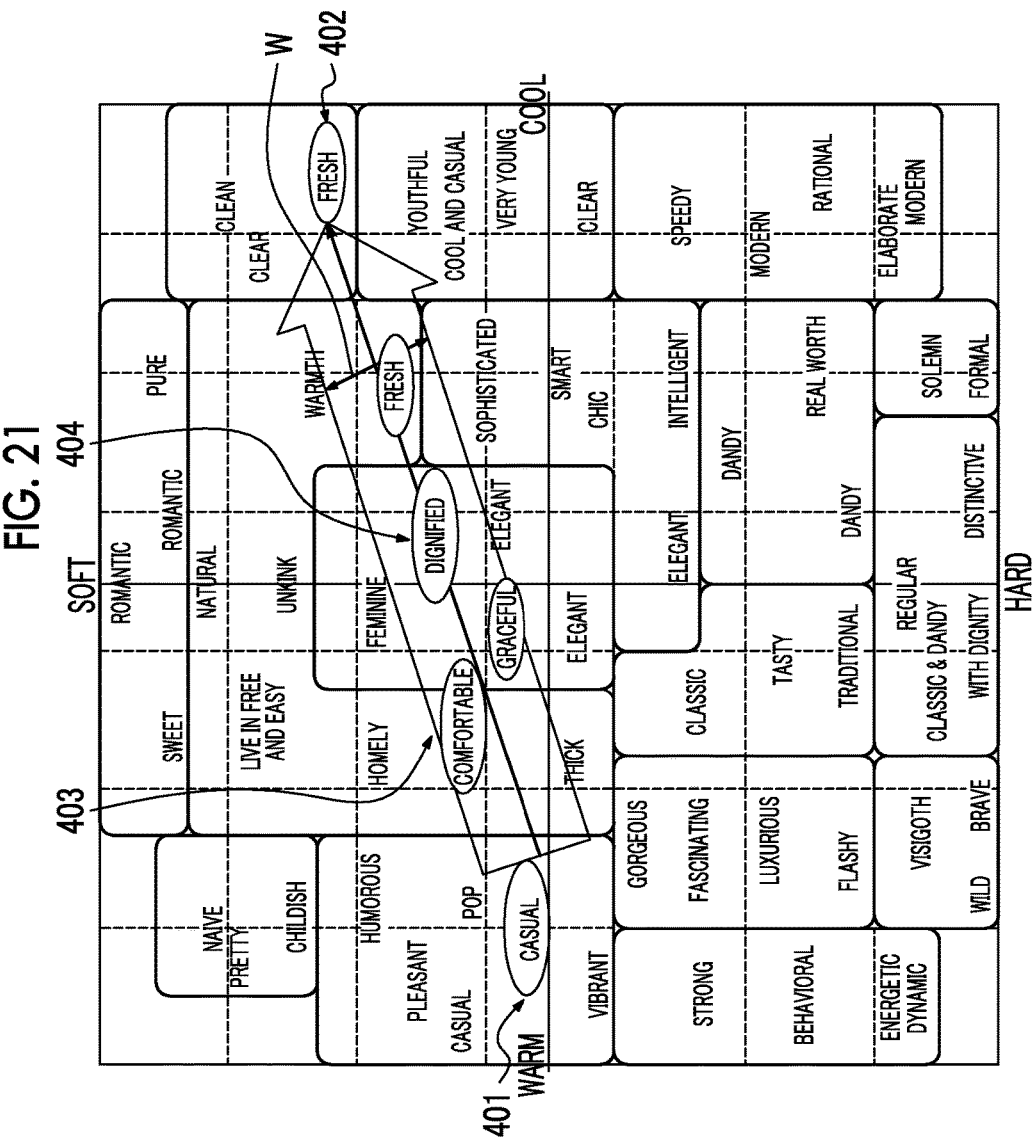

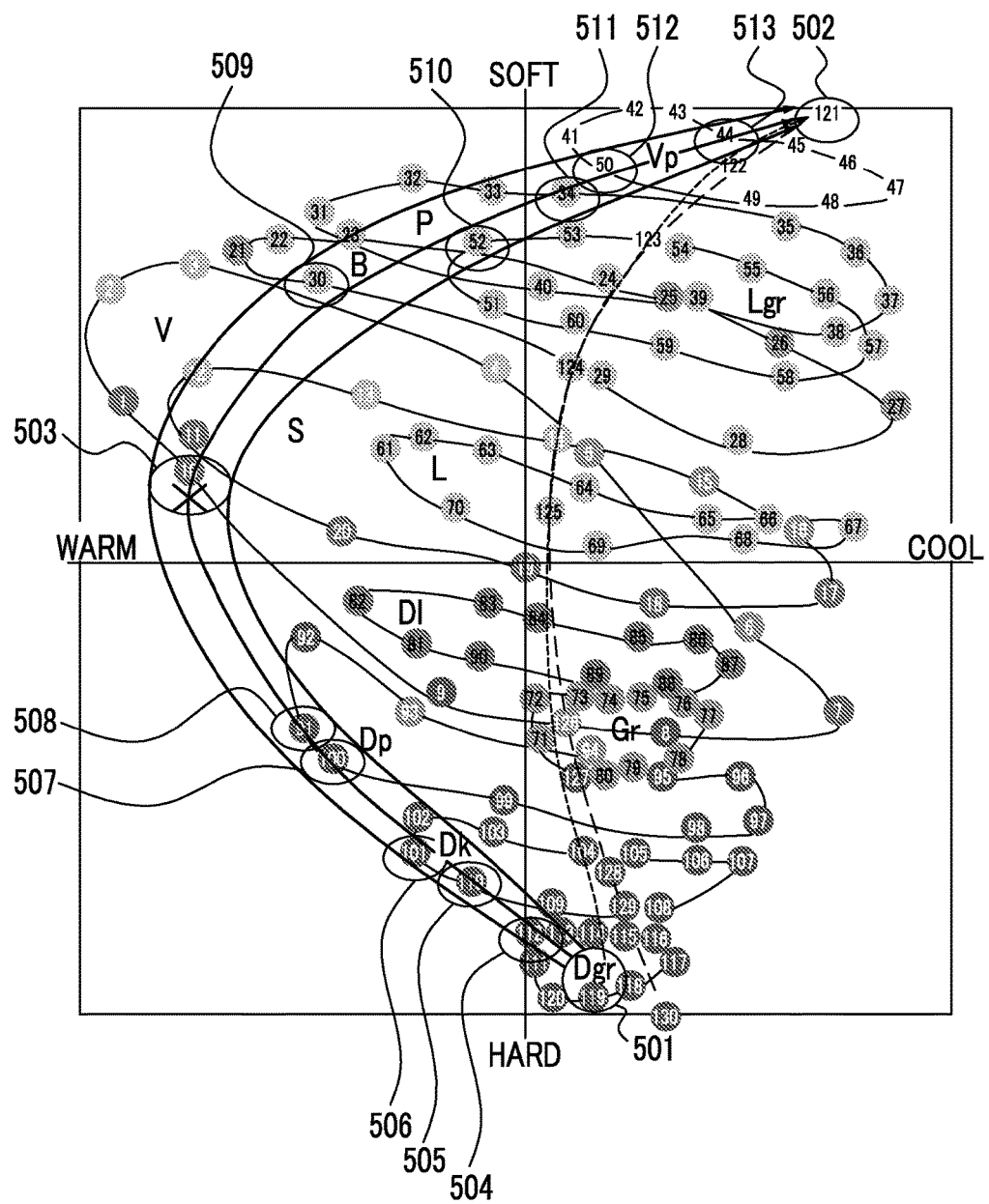

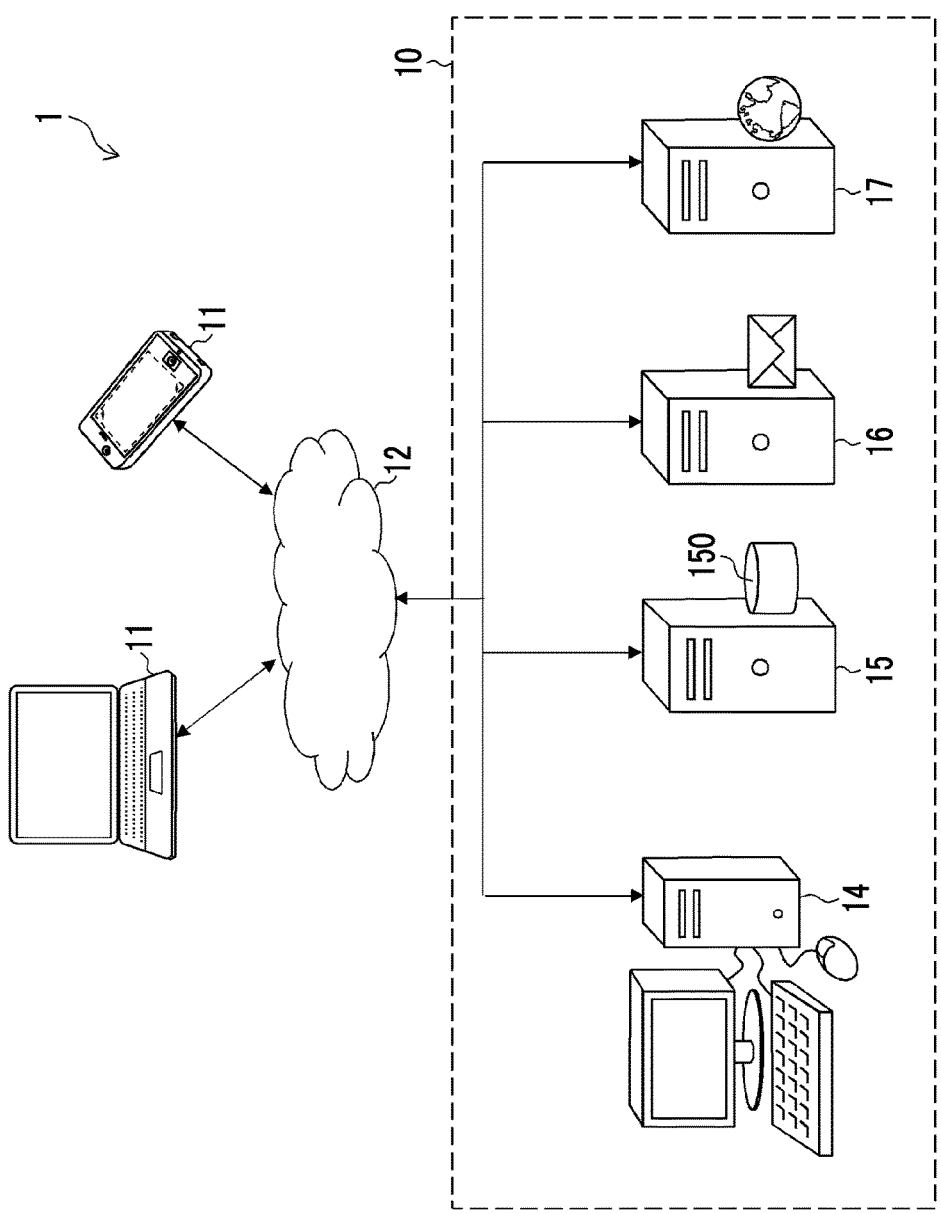

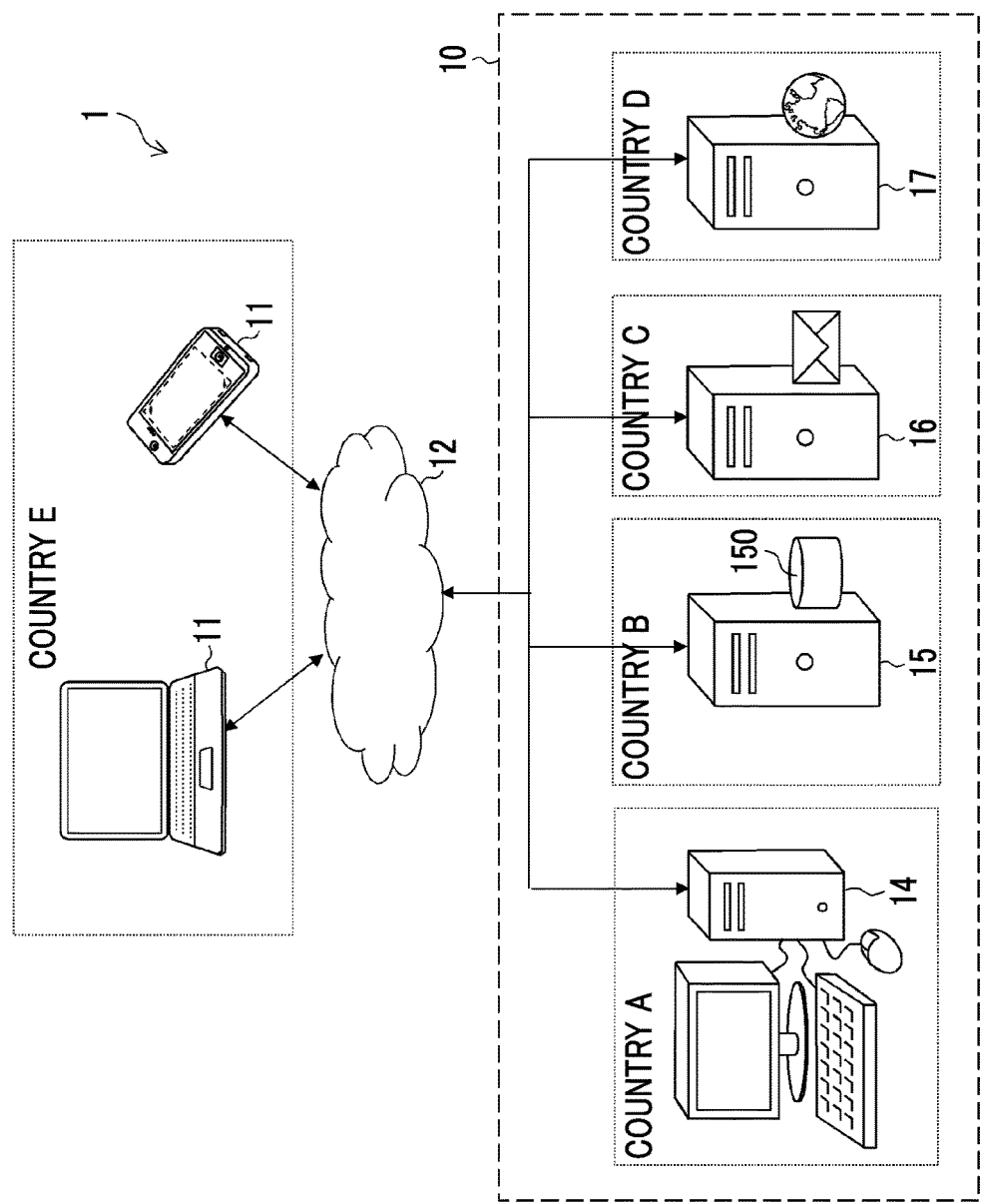

PRODUCT SEARCH APPARATUS, METHOD, AND SYSTEM

CROSS-REFERENCE TO RELATED APPLICATIONS

This application is a Continuation of PCT International Application No. PCT/JP2015/051242 filed on Jan. 19, 2015, which claims priority under 35 U.S.C. § 119(a) to Japanese Patent Application No. 2014-038522 filed on Feb. 28, 2014. Each of the above applications is hereby expressly incorporated by reference, in their entirety, into the present application.

BACKGROUND OF THE INVENTION

1. Field of the Invention

The present invention relates to a product search apparatus, a product search method, and a product search system that enable a consumer to smoothly perform the decision of purchase of a plurality of products.

2. Description of the Related Art

A technology for searching for a similar image of which the impression felt by a person is substantially the same as that of a specific image from a database when the specific image is selected from an illustrated image menu by a user is conventionally known.

JP1996-249353A (JP-H08-249353A) discloses a configuration in which a correlation between a sensibility feature amount used to identify an impression felt from any image by a designer and a physical feature amount extracted through calculation from an image processing result is obtained in advance using a statistical scheme, and a spatial distance (Euclidean distance) between a sensibility feature amount of an input image and a sensibility feature amount of a registered image is obtained for image search in image search at the time of designing. Specifically, in a coordinate space consisting of coordinate axes (for example, a hard/soft axis and a warm/cool axis) of the sensibility feature amount, a center point of image search is obtained based on a line segment determined by a coordinate position of a specific similar designated image designated from an illustrated image menu by a user and a coordinate position of a specific dissimilar designated image, and n registered images with a short spatial distance from the center point are searched for from a database in an order from the registered images with the shortest spatial distance. Accordingly, even in a case in which there are no images perfectly matching with an image desired to be searched for in an illustrated image menu or in a case in which a small variation such as a coloring change or a pattern change has been applied to illustrated images, an image of which the impression felt by a person is substantially the same as that of the specific image designated by the user can be accurately searched for and displayed.

JP1997-114853A (JP-H09-114853A) discloses a configuration in which a plurality of registered images are prestored as pattern samples together with physical feature amounts in a database, and if a sensibility word (for example, "sharper") determining a shift rule for a reference coordinate position is indicated and input by a user in a coordinate space consisting of coordinate axes (for example, an axis of a thickness of a line, an axis of a degree of left-right symmetry, and an axis of a density of a space) of the physical feature amounts in image search at the time of designing, a shift corresponding to the input sensibility word (for example, a shift to a coordinate position at which a value of the thickness of the line is smaller) from a reference coordinate position corresponding to the physical feature amount of a specific image is performed, and an image with a short spatial distance around the shifted reference coordinate position is searched for from a database. Accordingly, an image of which the impression felt by a person is substantially the same as that of the specific image designated by the user can be accurately searched for and displayed.

SUMMARY OF THE INVENTION

In a case in which an image of a recommended product is displayed on a terminal apparatus (hereinafter referred to as a "client apparatus") of a consumer over a network, if images of a plurality of recommended products are displayed at random without consideration of an impression that the consumer feels from the product images, there is a problem in that the images are disorderly displayed and products that the consumer desires to purchase are not narrowed down or a problem in that a consumer tires before the consumer finds a favorite product. That is, there is a problem in that it is difficult for the consumer to decide on a purchase when images of recommended products are simply displayed at random. In particular, in a case in which the consumer purchases a plurality of different products in a plurality of categories such as clothes and pants, the consumer is confused by coordination thereof and a probability of the consumer not performing a purchase decision through Internet shopping increases. Further, in a case in which the consumer desires to purchase a plurality of different products in one category, the consumer may also be confused by coordination thereof.

Further, a known image search technology for a designer as disclosed in JP1996-249353A (JP-H08-249353A) and JP1997-114853A (JP-H09-114853A) has been considered for application to image search for product recommendation to a general consumer. However, the related technology described in JP1996-249353A (JP-H08-249353A) and JP1997-114853A (JP-H09-114853A) is an image search technology for a designer, and may be efficient for a designer desiring to create similar designs from previously created designs, but an image search technology for product recommendation suitable for a consumer desiring to simultaneously purchase a plurality of products is not provided.

The present invention has been made in view of such circumstances, and an object thereof is to provide a product search apparatus, a product search method, and a product search system that enable a consumer to smoothly perform decision of purchase of a plurality of products.

To achieve the above object, the present invention provides a product search apparatus using a product database for storing a plurality of images corresponding to a plurality of respective products, a physical amount of the images of the products, and a category of the products in association with one another, the product search apparatus comprising: a physical amount acquisition unit that acquires a physical amount of an image of a specific product from the product database; a first conversion unit that converts the acquired physical amount of the image of the specific product into information indicating a specific-product sensibility block that is a block corresponding to the image of the specific product among a plurality of blocks in a sensibility space in which a plurality of sensibility words representing sensibility of a person are arranged; a second conversion unit that converts information indicating a block of interest selected from among the plurality of blocks in the sensibility space based on information indicating the specific-product sensibility block obtained by the first conversion unit into information indicating a range of a physical amount of an image corresponding to the block of interest; a category selection unit that selects a search target category from among a plurality of categories stored in the product database based on a category of the specific product acquired from the product database; and a search unit that searches for an image corresponding to the search target category and the block of interest from the product database based on the search target category selected by the category selection unit and the information indicating the range of the physical amount obtained by the second conversion unit.

According to the present invention, since a search range of the physical amount is selected through the sensibility space and a search range of categories is selected based on the category of the specific product, it is possible to recommend products according to the sensibility of a person based on the specific product and for a consumer to smoothly perform decision of purchase of a plurality of products even in a case in which the consumer desires to purchase a plurality of different products in one category or in a case in which the consumer desires to purchase a plurality of products in a plurality of different categories.

In one aspect of the present invention, the category selection unit selects the same category as that of the specific product as the search target category. Accordingly, in a case in which the consumer desires to purchase a plurality of different products in one category, it is possible to prompt a purchasing decision of the consumer.

In one aspect of the present invention, the category selection unit selects a category of a product of which the wearing position on the body is the same as that of the specific product, as the search target category. Accordingly, in a case in which the consumer desires to purchase a plurality of products in a plurality of different categories, it is possible to prompt a purchasing decision of the consumer.

In one aspect of the present invention, the category selection unit selects a category of a product of which the wearing position on the body is adjacent to, close to, or partially overlapping that of the specific product, as the search target category. Accordingly, in a case in which the consumer desires to purchase a plurality of products in a plurality of categories with different wearing positions, it is possible to prompt a purchasing decision of the consumer.

In one aspect of the present invention, the product search apparatus further comprises: a category-to-body position database that stores category-to-body position information indicating a correspondence relationship between each category stored in the product database and a body position of a person, and the category selection unit selects the search target category based on the category-to-body position information. Accordingly, in a case in which the consumer desires to purchase a plurality of products in a plurality of categories with different wearing positions, it is possible to prompt a purchasing decision of the consumer.

In one aspect of the present invention, the product search apparatus further comprises: a block-of-interest selection unit that selects at least one of a block adjacent to the specific-product sensibility block, a block close to the specific-product sensibility block, or a block partially overlapping the specific-product sensibility block in the sensibility space, as the block of interest. Accordingly, since the user can select a product of a dissimilar image of which the impression felt by a person is slightly different from that of the specific product, it is possible to set a selection range for the user to an appropriate range.

In one aspect of the present invention, the product search apparatus further comprises: a block-of-interest selection unit that selects an opposite-word sensibility block that is a block including a sensibility word with an opposite meaning to the sensibility word corresponding to the image of the specific product, as the block of interest. Accordingly, a product of an image completely different in sensibility from the specific product can be recommended to the user, and it is possible to promote a purchase motivation of the user.

In one aspect of the present invention, the block-of-interest selection unit also selects a block arranged between the specific-product sensibility block and the opposite-word sensibility block in the sensibility space, as the block of interest. Accordingly, since a block arranged between the specific-product sensibility block and the opposite-word sensibility block, as well as the opposite-word sensibility block, is included in the search range, it is possible to widen the product selection range for the user to an appropriate range.

In one aspect of the present invention, the product search apparatus further comprises: a user designation information reception unit that receives information indicating at least one of a user-designated sensibility word or a user-designated block, and a block-of-interest selection unit that selects a block in the sensibility space corresponding to the user-designated sensibility word or a user-designated sensibility block that is a block in the sensibility space designated by the user, as the block of interest. This makes it possible to recommend a product of an image dissimilar to that of specific product according to a user designation.

In one aspect of the present invention, the block-of-interest selection unit also selects a block arranged between the specific-product sensibility block and the user-designated sensibility block in the sensibility space, as the block of interest. Accordingly, since the block arranged between the specific-product sensibility block and the user-designated sensibility block as well as the user-designated sensibility block is included in the search range, it is possible to widen a product selection range for a user to an appropriate range.

In one aspect of the present invention, the product search apparatus further comprises: a block-of-interest selection unit that selects a block arranged on a curve connecting three blocks including a first sensibility word block and a second sensibility word block, the first sensibility word block and the second sensibility word block being blocks respectively corresponding to a first sensibility word and a second sensibility word with opposite meanings, and a specific-product sensibility block, as a block of interest.

In one aspect of the present invention, the product search apparatus further comprises: a conversion database that stores conversion data indicating a correspondence relationship between information indicating respective blocks in the sensibility space and a range of the physical amount of the images of the plurality of products, and the second conversion unit performs conversion based on the conversion data.

In one aspect of the present invention, the physical amount is at least one of a color feature amount, a shape feature amount, a pattern feature amount, or a texture feature amount.

In one aspect of the present invention, the product search apparatus further comprises: an output unit that outputs an image searched for by the search unit.

Further, the present invention provides a product search system comprising a server apparatus constituting the product search apparatus, and a client apparatus connected to the server apparatus over a network, wherein the client apparatus includes a display unit; a client input unit that receives an input of information indicating the specific product or information indicating an image of the specific product; a terminal transmission unit that transmits information received by the client input unit to the server apparatus; a terminal reception unit that receives the search image that is transmitted from the server apparatus over the network; and a control unit that displays the image received by the terminal reception unit on the display unit, the physical amount acquisition unit of the server apparatus acquires the physical amount of the image of the specific product based on information transmitted from the client apparatus and information stored in the product database, and the server apparatus transmits the search image to the client apparatus.

Further, the present invention provides a product search method using a product database for storing a plurality of images corresponding to a plurality of respective products, a physical amount of the images of the products, and a category of the products in association with one another, the product search method comprising: a process of acquiring a physical amount of an image of a specific product from the product database; a first conversion process of converting the acquired physical amount of the image of the specific product into information indicating a specific-product sensibility block that is a block corresponding to the image of the specific product among a plurality of blocks in a sensibility space in which a plurality of sensibility words representing sensibility of a person are arranged; a second conversion process of converting information indicating a block of interest selected from among the plurality of blocks in the sensibility space based on information indicating the specific-product sensibility block obtained in the first conversion process into information indicating a range of a physical amount of an image corresponding to the block of interest; a category selection process of selecting a search target category from among a plurality of categories stored in the product database based on the category of the specific product acquired from the product database; and a process of searching for an image corresponding to the search target category and the block of interest from the product database based on the search target category selected in the category selection process and the information indicating the range of the physical amount obtained in the second conversion process.

According to the present invention, it is possible to provide a product search apparatus, a product search method, and a product search system that enable a consumer to smoothly perform decision of purchase of a plurality of products even in a case in which the consumer desires to purchase a plurality of different products in one category or in a case in which the consumer desires to purchase a plurality of products in a plurality of different categories.

BRIEF DESCRIPTION OF THE DRAWINGS

FIG. 20 is a diagram illustrating a flow of a process of the entire product search system in the third embodiment.

FIG. 21 is an illustrative diagram used in description of an example of selection of a block of interest in the third embodiment.

FIG. 22 is an illustrative diagram used in description of an example of selection of a block of interest in a fourth embodiment.

FIG. 23 is a configuration diagram of a first system used for description of a variation of the product search system.

FIG. 24 is a configuration diagram of a second system used for description of a variation of the product search system.

DESCRIPTION OF THE PREFERRED EMBODIMENTS

Hereinafter, embodiments of the present invention will be described in detail with reference to the accompanying drawings.

Figure 1:
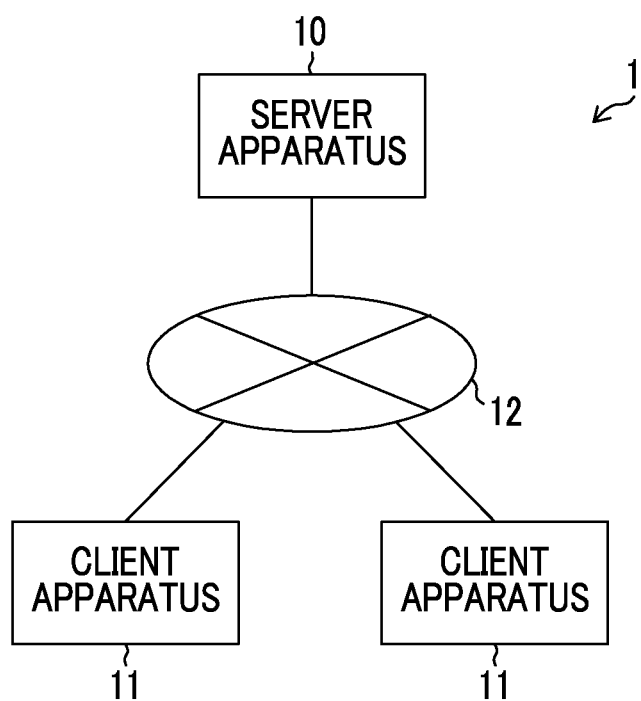
FIG. 1 is a system configuration diagram of a product search system.

FIG. 1 is a system configuration diagram of a product search system.

In FIG. 1, a product search system 1 has a configuration in which a server apparatus 10 corresponding to one form of a product search apparatus of the present invention and a client apparatus 11 that is a terminal of a user are connected over a network 12 such as the Internet.

Figure 2:
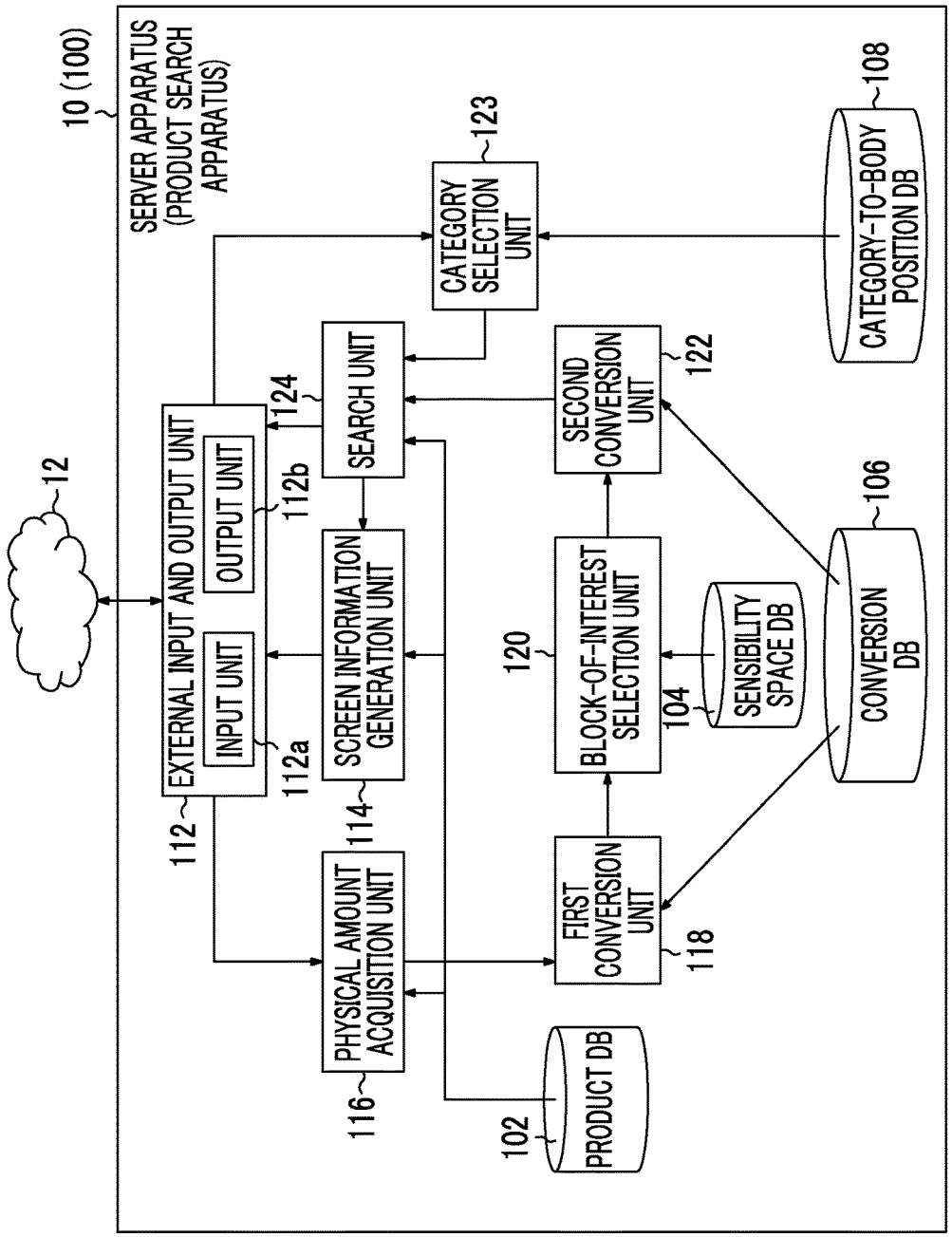
FIG. 2 is a block diagram illustrating an example of a main configuration of a server apparatus (product search apparatus).

FIG. 2 is a block diagram illustrating an example of a main configuration of the server apparatus 10.

The server apparatus 10 of this example is a server apparatus constituting a product search apparatus 100 that searches for a product image from a product database 102. The server apparatus 10 includes the product database 102 that stores a plurality of product images corresponding to a plurality of respective products, a physical amount of the product images, and a category of products in association with one another, a sensibility space database 104 that stores various types of information in a sensibility space (hereinafter referred to as "sensibility space information") in which a plurality of sensibility words indicating sensibility of a person are arranged in association with each other, a conversion database 106 that stores data for converting the physical amount of the product image stored in the product database 102 and the sensibility space information stored in the sensibility space database 104, a category-to-body position database 108 that stores category-to-body position information indicating a correspondence relationship between each category and a body position of a person stored in the product database 102, an external input and output unit 112 having an input unit 112a that performs an information input from the client apparatus 11 and an output unit 112b that performs an information output to the client apparatus 11, a screen information generation unit 114 that generates screen information to be displayed on the client apparatus 11, a physical amount acquisition unit 116 that acquires a physical amount of an image of a specific product from the product database 102, a first conversion unit 118 that converts the physical amount of the image of the specific product into information indicating a block (hereinafter referred to as a "specific-product sensibility block") corresponding to the image of the specific product among a plurality of blocks in the sensibility space using the conversion database 106, a block-of-interest selection unit 120 that selects, as a block of interest, the same or different block from the specific-product sensibility block from among the plurality of blocks in the sensibility space based on information indicating the specific-product sensibility block using the sensibility space database 104, a second conversion unit 122 that converts information indicating the block of interest in the sensibility space into information indicating a range of the physical amount of the product image corresponding to the block of interest using the conversion database 106, a category selection unit 123 that selects a search target category from among a plurality of categories stored in the product database 102 based on a category of the specific product using the category-to-body position database 108, and a search unit 124 that searches for a product image corresponding to the search target category and the block of interest from the product database 102 based on the search target category selected by the category selection unit 123 and the information indicating the range of the physical amount obtained in the second conversion unit 122. The product image searched for by the search unit 124 is output to the client apparatus 11 by the output unit 112b.

<Product Database>

Figure 3:
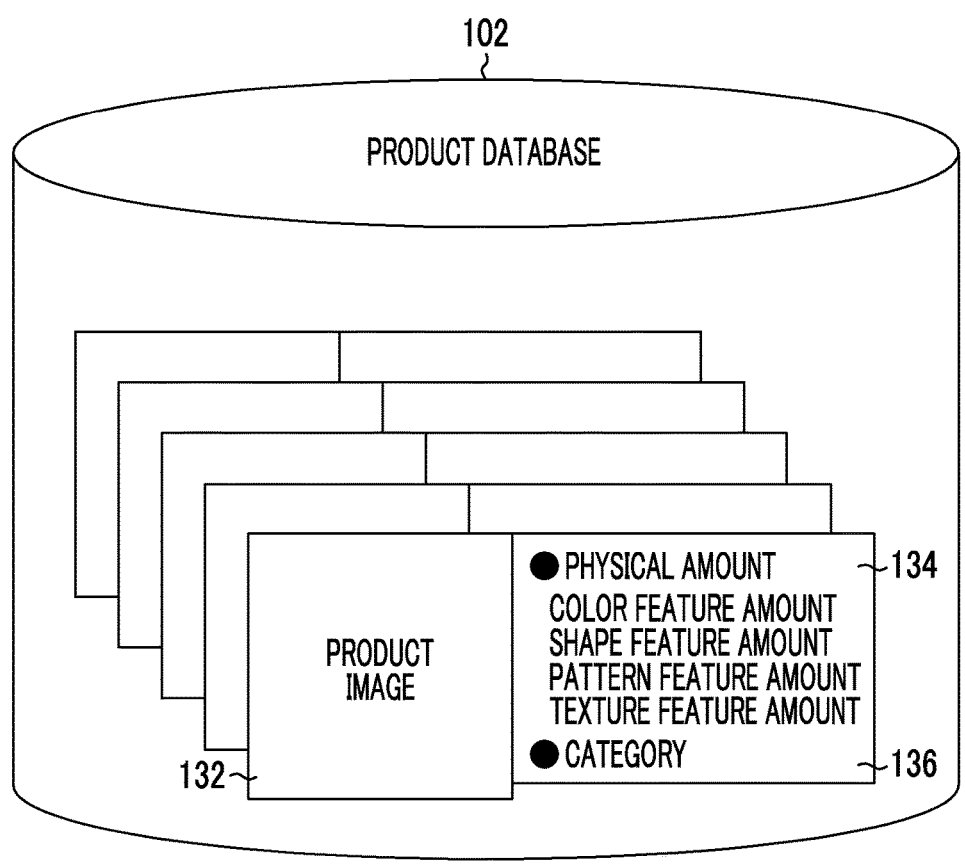
FIG. 3 is a diagram illustrating an example of a configuration of a product database.

FIG. 3 is a diagram illustrating an example of a configuration of the product database 102. The product database 102 stores a plurality of product images 132 corresponding to a plurality of respective products, a physical amount 134 of the product images 132, and a category 136 of the product in association with one another. A color feature amount, a shape feature amount, a pattern feature amount, and a texture feature amount of the product image 132 are included as the physical amount 134 (also referred to as a "physical feature amount") of the product image 132.

Further, the product database 102 may store various types of attribute information on the product such as price of the product in association with the product image 132, separately from the physical amount 134 and the category 136 of the product of the product image 132.

The color feature amount is a feature amount regarding color of the product image. For example, the color feature amount indicates a representative color or a color arrangement (a combination of colors) of the product image. In this example, the color feature amount measured by image-analyzing the product image is stored in the product database 102.

The shape feature amount is a feature amount regarding a shape of all or part of the product represented in the product image. Examples of the shape feature amount may include a degree of fineness/thickness of a width of the product, and a feature amount indicating a length of a sleeve, a shape, size, and/or angle of a collar, a size of a free area of a neck, an angle of a V-neck, or a curvature of a U-neck if the product is clothes. A feature amount indicating a shape, a size, or the like of an ornament (for example, ribbon) is included in the shape feature amount. In this example, the shape feature amount measured by image-analyzing the product image is stored in the product database 102.

The pattern feature amount indicates a type (for example, a floral pattern), a size, or the like of a pattern within the product image. In this example, the pattern feature amount measured by image-analyzing the product image is stored in the product database 102.

The texture feature amount indicates a degree of a texture such as gloss of the product image. In this example, the texture feature amount measured by image-analyzing the product image is stored in the product database 102.

The category 136 of the product is a type of product in other words. In the case of a product worn by a body of a person, the category is, for example, a T-shirt, a sweater, a coat, jeans, or a skirt.

<Category-to-Body Position Database>

Figure 4:
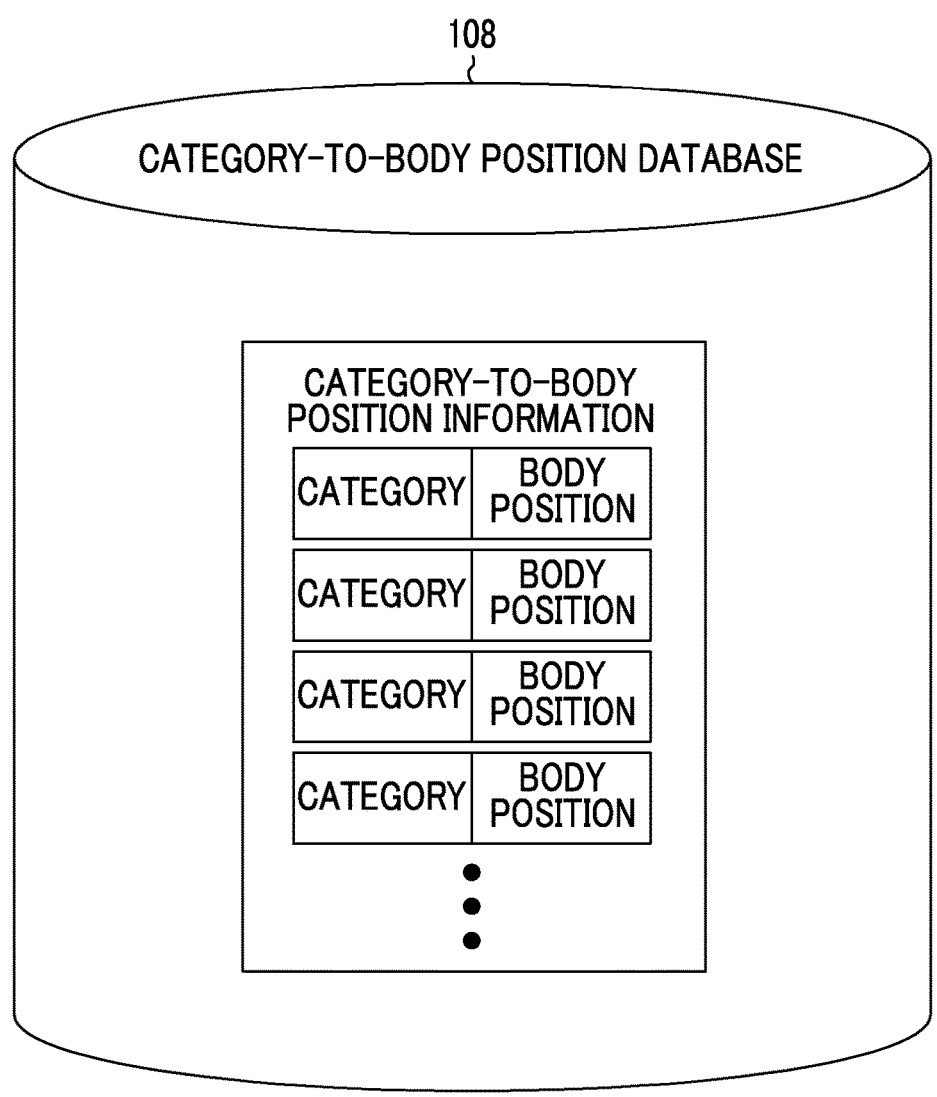
FIG. 4 is a diagram illustrating an example of a configuration of a category-to-body position database.

FIG. 4 is a diagram illustrating an example of a configuration of the category-to-body position database 108. The category-to-body position database 108 of FIG. 4 is a database regarding a product worn by a human body, and stores category-to-body position information indicating a correspondence relationship between each category stored in the product database 102 and a body position of a person.

The "body position" is information indicating a position on a body of a person, and indicates a position at which the product can be worn. The body position is, for example, a body, a leg, or a head. The body position may be defined according to a shape of the product. For example, if there are only four categories including a T-shirt, a sweater, jeans, and a skirt, only two body positions including an upper body and a lower body may be defined. The "body position" may be added. For example, if a hat is added as a category, a head is added, if gloves are added as a category, a hand is added, and if shoes are added as a category, a leg is added.

<Sensibility Space and Sensitivity Space Database>

Figure 5:
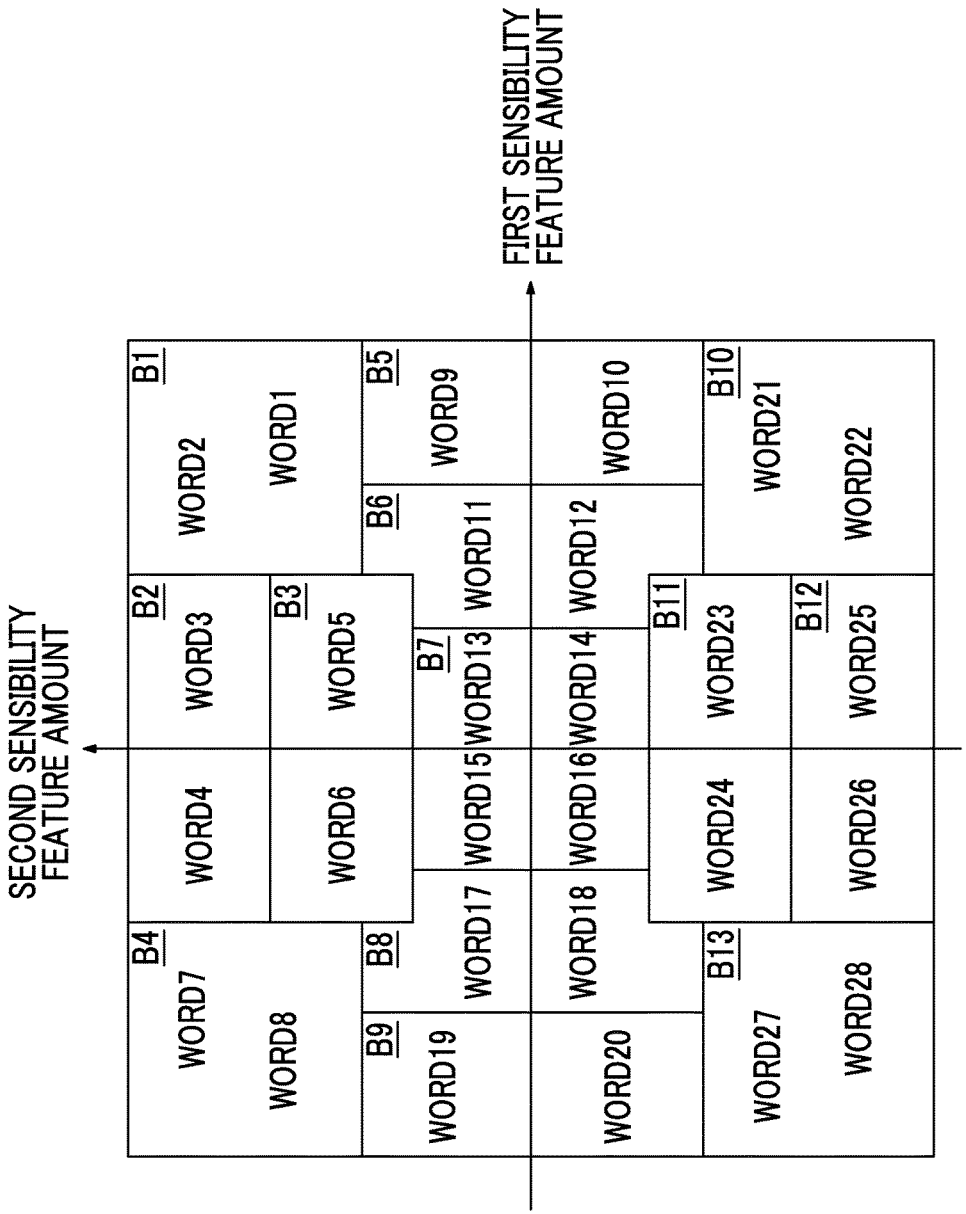
FIG. 5 is a conceptual diagram of a sensibility space (an aspect in which sensibility words are grouped and partitioned into blocks).
Figure 6:
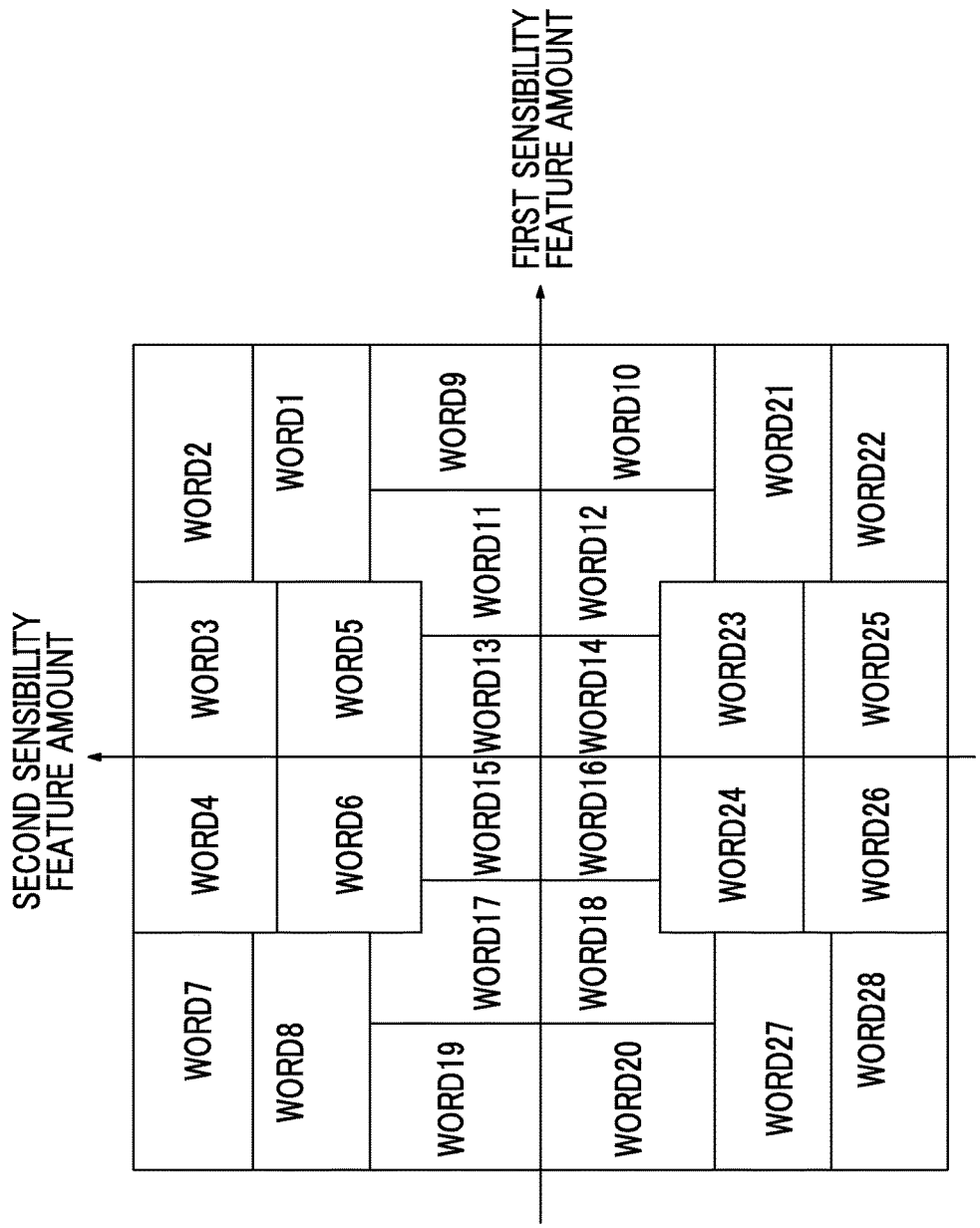
FIG. 6 is a conceptual diagram of a sensibility space (an aspect in which each sensibility word is partitioned into a block).

FIGS. 5 and 6 are conceptual diagrams of a sensibility space. In the sensibility space in FIG. 5 and the sensibility space in FIG. 6, coordinate axes (an axis of a first sensibility feature amount and an axis of a second sensibility feature amount) and sensibility words (WORD1 to WORD28) are the same. However, both of the sensibility spaces are different in that the sensibility space in FIG. 5 is an aspect in which a plurality of sensibility words are grouped to constitute blocks (B1 to B13), whereas the sensibility space in FIG. 6 is an aspect in which a block is constituted for each sensibility word. The aspect of the block is not limited. Further, both of the aspect in which a plurality of sensibility words are grouped to constitute blocks as illustrated in FIG. 5 and the aspect in which a block is constituted for each sensibility word as illustrated in FIG. 6 may be adopted. FIGS. 5 and 6 illustrate a concept of the sensibility spaces, and number of coordinate axes (the number of dimensions of the sensibility space), a type of sensibility feature amount constituting the coordinate axes, the number and type of sensibility words, the number, shape, and size of blocks, or the like is not particularly limited.

The sensibility space of the present specification has (Feature 1) to (Feature 3) below.

(Feature 1) The sensibility space is a multidimensional coordinate space having a plurality of sensibility feature amounts as axes. The sensibility space illustrated in FIGS. 5 and 6 are two-dimensional sensibility spaces each including an axis (X-axis) of the first sensibility feature amount and an axis (Y-axis) of the second sensibility feature amount, but three or more dimensional sensibility spaces. The sensibility feature amount indicates a degree of an impression of a person observing an image.

(Feature 2) A plurality of sensibility words are associated with the sensibility feature amounts constituting the axes of the sensibility space, and are arranged in the sensibility space. In the sensibility spaces illustrated in FIGS. 5 and 6, 28 sensibility words WORD1 to WORD28 are arranged, but the number of sensibility words is not particularly limited. The sensibility word is a word representing the impression of the person observing the image.

(Feature 3) The sensibility space is partitioned into a plurality of blocks (hereinafter referred to as "sensibility blocks"), and one or more sensibility words belong to each block. The number and shape of the sensibility blocks are not particularly limited.

Figure 7:
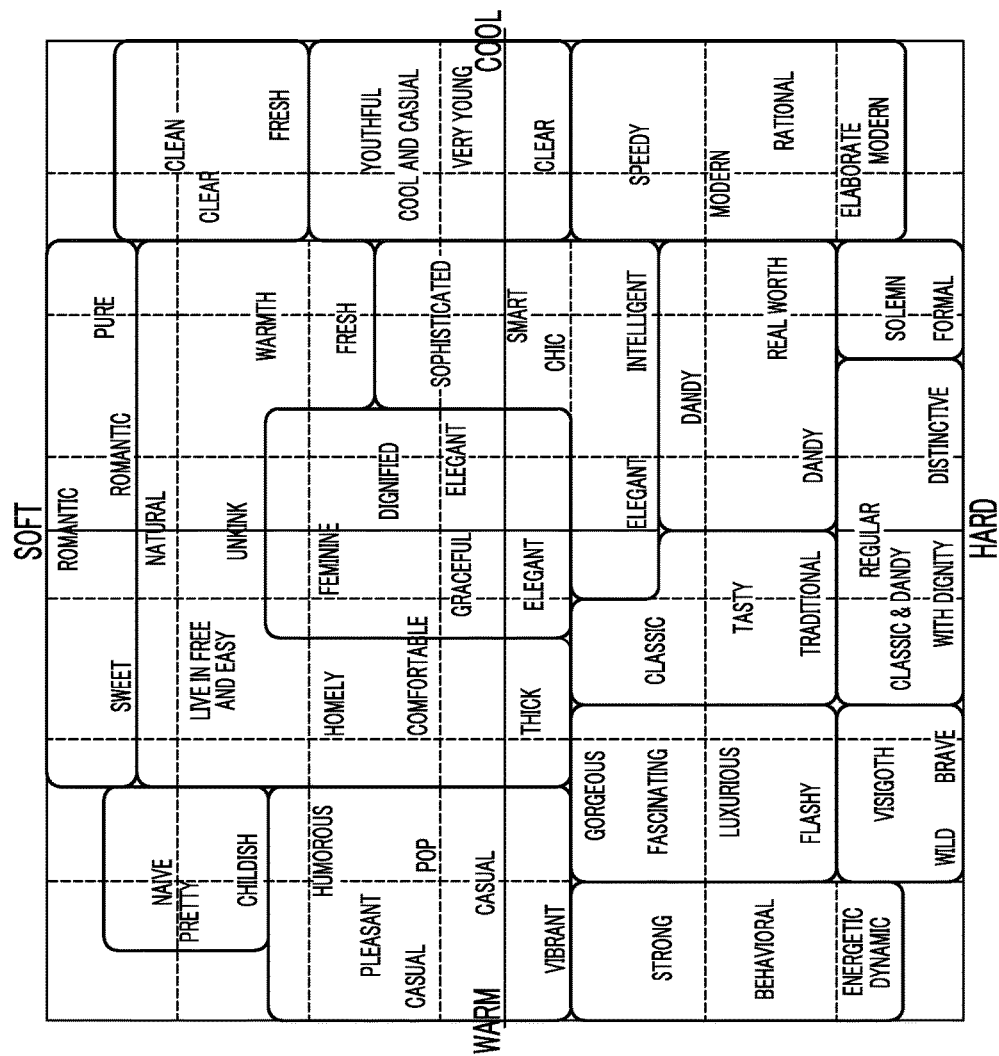
FIG. 7 is a diagram illustrating an example of a sensibility space.
Figure 8:
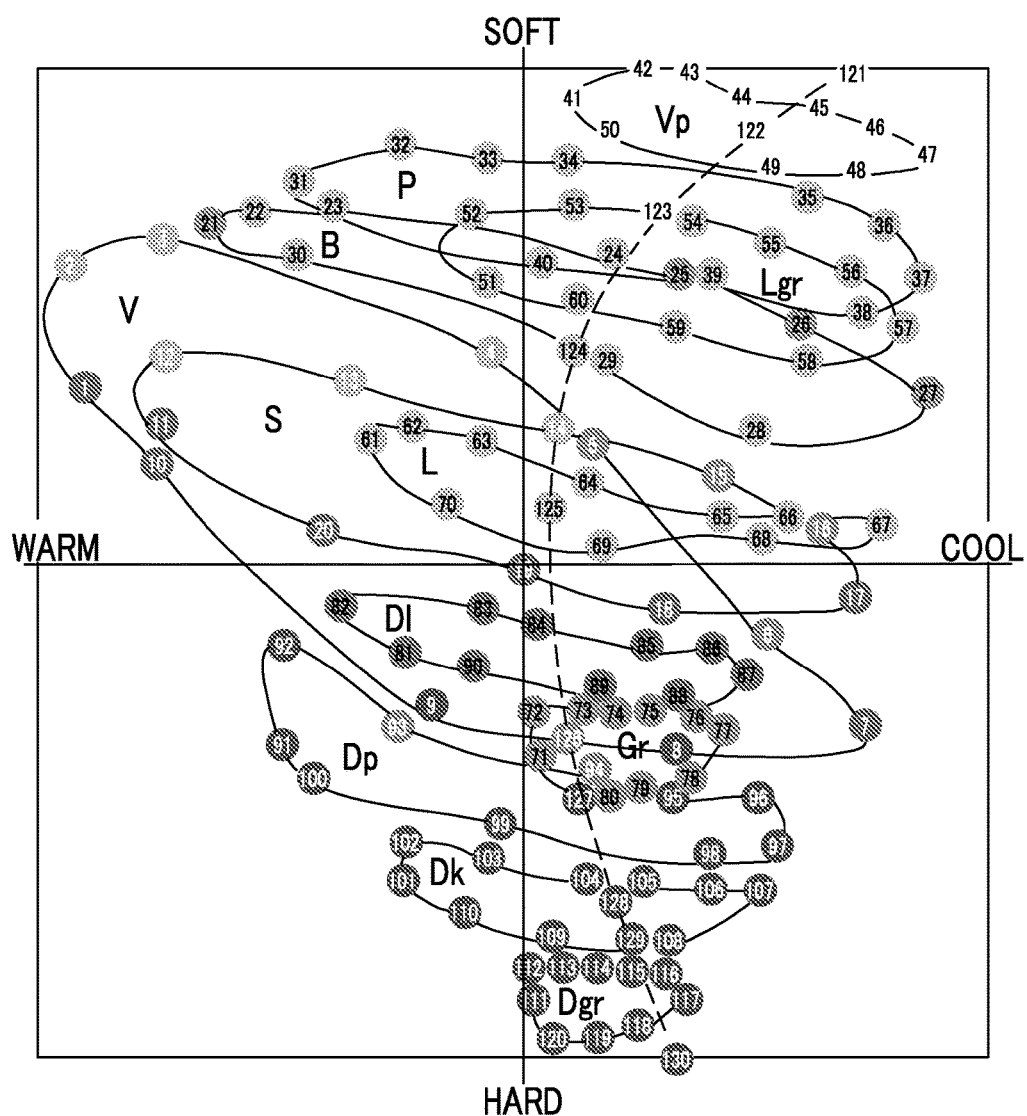
FIG. 8 is a diagram illustrating another example of a sensibility space.

FIGS. 7 to 8 illustrate an image scale disclosed from Nippon Color & Design Research Institute Inc. (see Shigenobu Kobayashi, "Color System" (Kodansha Ltd.), and http://www.ncd-ri.co.jp/about/image_system.html). Here, the "image scale" corresponds to one form of a "sensibility space".

The image scale illustrated in FIG. 7 includes a horizontal axis indicating a degree of WARM/COOL corresponding to the axis of the first sensibility feature amount and a vertical axis indicating a degree of HARD/SOFT corresponding to the axis of the second sensibility feature amount. Further, 66 sensibility words are arranged and partitioned into 16 blocks.

An image scale illustrated in FIG. 8 includes the two axes (a WARM/COOL axis and a HARD/SOFT axis) that are the same as those in FIG. 7, and a single color is associated as the color feature amount. Although the single color is represented in grayscale for convenience of illustration in FIG. 8, the single color is actually represented in color. For example, a warm color such as red or orange is associated with "WARM" (a left end side in FIG. 8), a cold color such as blue or blue-green is associated with "COOL" (a right end side in FIG. 8), a pale tone color such as berry pale or pale is associated with "SOFT" (an upper end side in FIG. 8), and a dark tone color such as dark grayish or deep color is associated with "HARD" (an lower end side in FIG. 8). In FIG. 8, an impression that a person feels from colors close in position is similar, and an impression that the person feels from colors far in position is not similar. Although there are portions in which no single color is arranged to lower right or upper left of FIG. 8, a plurality of color arrangements (in other words, "a combination of a plurality of colors") can be arranged.

The sensibility space in which the color feature amount of the single color is associated is illustrated in FIG. 8, but the sensibility space used in the present invention is not particularly limited to such a case. As described in the literature disclosed by Nippon Color & Design Research Institute Inc., a plurality of color arrangements may be considered as color feature amounts in a physical measurement space represented by a physical amount, and the plurality of color arrangements may be associated with a sensibility space. Using the plurality of color arrangements as the color feature amount, it is possible to associate the color feature amount in a portion in which an arrangement of single color is impossible or inappropriate in the sensibility space. Further, the shape feature amount, the pattern feature amount, and the texture feature value may be associated with the sensibility space.

The sensibility space database 104 stores sensibility space information (for example, sensibility feature amounts constituting an axis, sensibility words, and blocks) which is information in the sensibility space illustrated in FIGS. 5 to 8 in association with one another.

Figure 9:
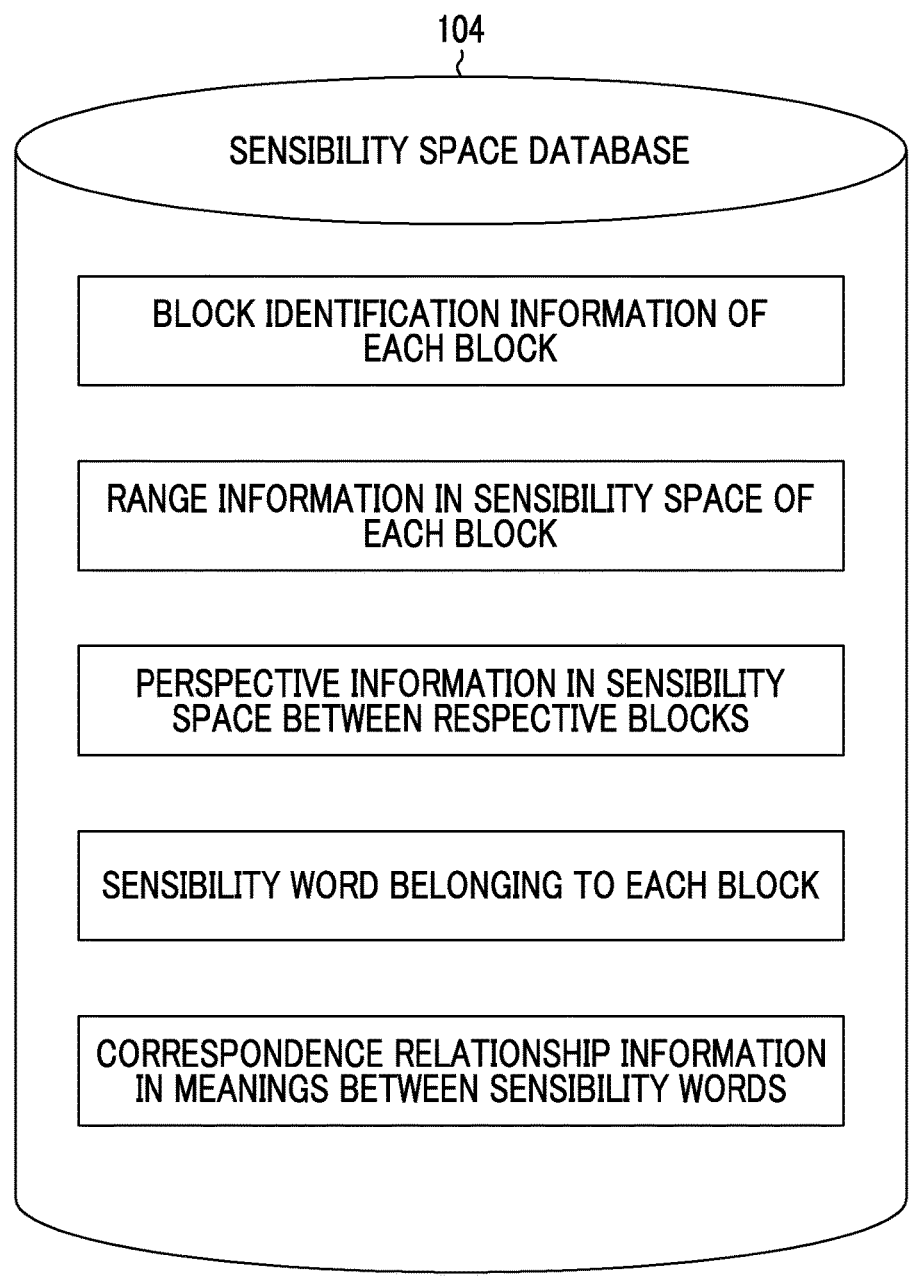
FIG. 9 is a diagram illustrating an example of a configuration of a sensibility space database.

The sensibility space database 104 illustrated in FIG. 9 stores the following information as the sensibility space information.

Block identification information of each block

Range information in the sensibility space of each block (for example, coordinates of each vertex of the block or contour information)

Perspective information in the sensibility space between respective blocks (for example, close/non-close, adjacent/non-adjacent, and overlapping/non-overlapping between the blocks)

Sensitivity word belonging to each block

Correspondence relationship information in meanings between sensibility words (for example, a combination of opposite words or a combination of similar words)

In a case in which both of the block (hereinafter referred to as a "large block") in which a plurality of sensibility words are grouped as in the aspect illustrated in FIG. 5 and the block (hereinafter referred to as a "small block") of each sensibility word as in the aspect illustrated in FIG. 6 are used, sensibility space information (block identification information, range information, distance information, and sensibility word) of the large block and sensibility space information (block identification information, range information, distance information, and sensibility word) of the small block are stored in the sensibility space database 104.

Further, in a case in which only the small block illustrated in FIG. 6 is used, the block identification information may be used in place of the sensibility word.

<Conversion Database>

Figure 10:
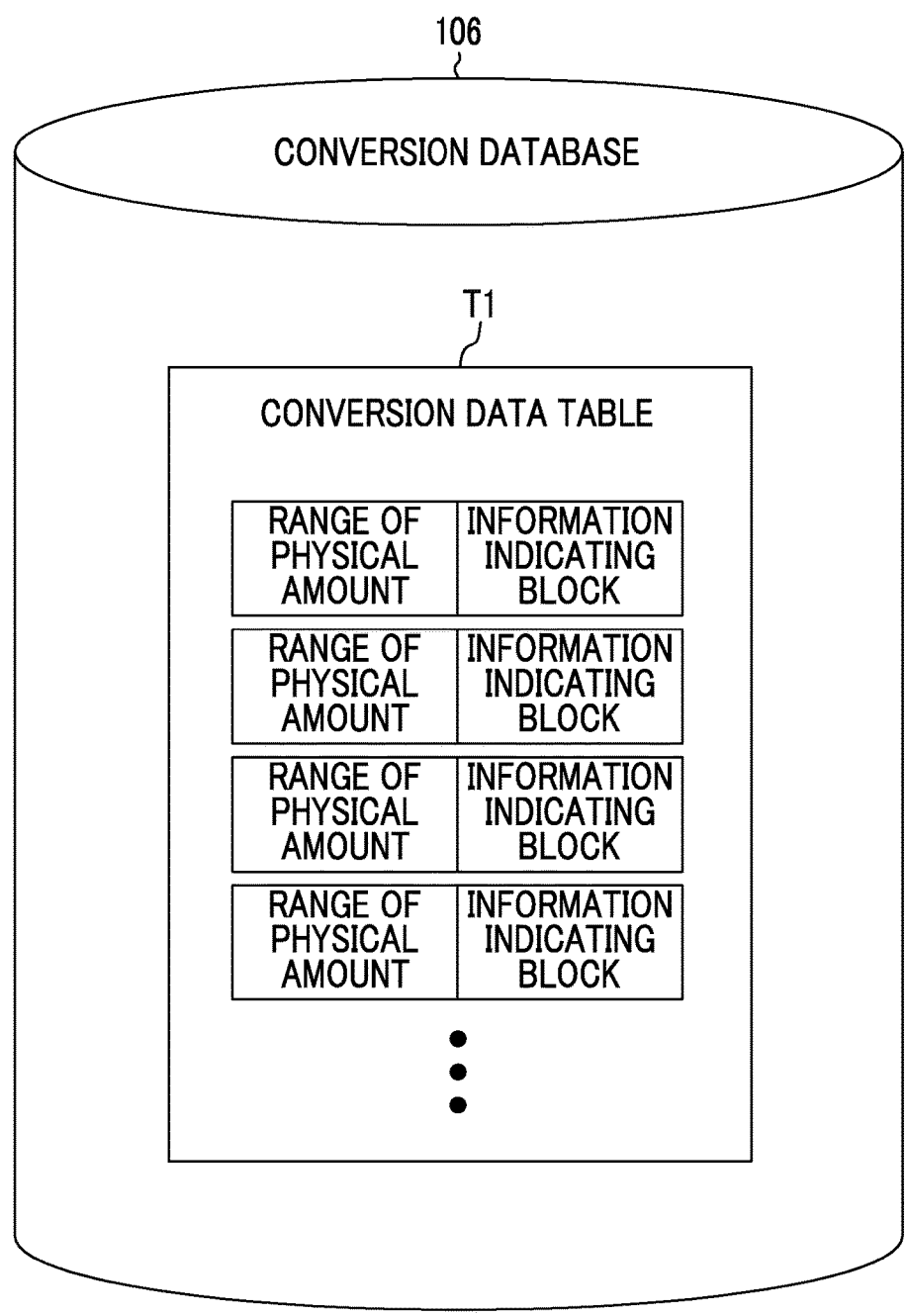
FIG. 10 is a diagram illustrating an example of a configuration of a conversion database.
Figure 11:
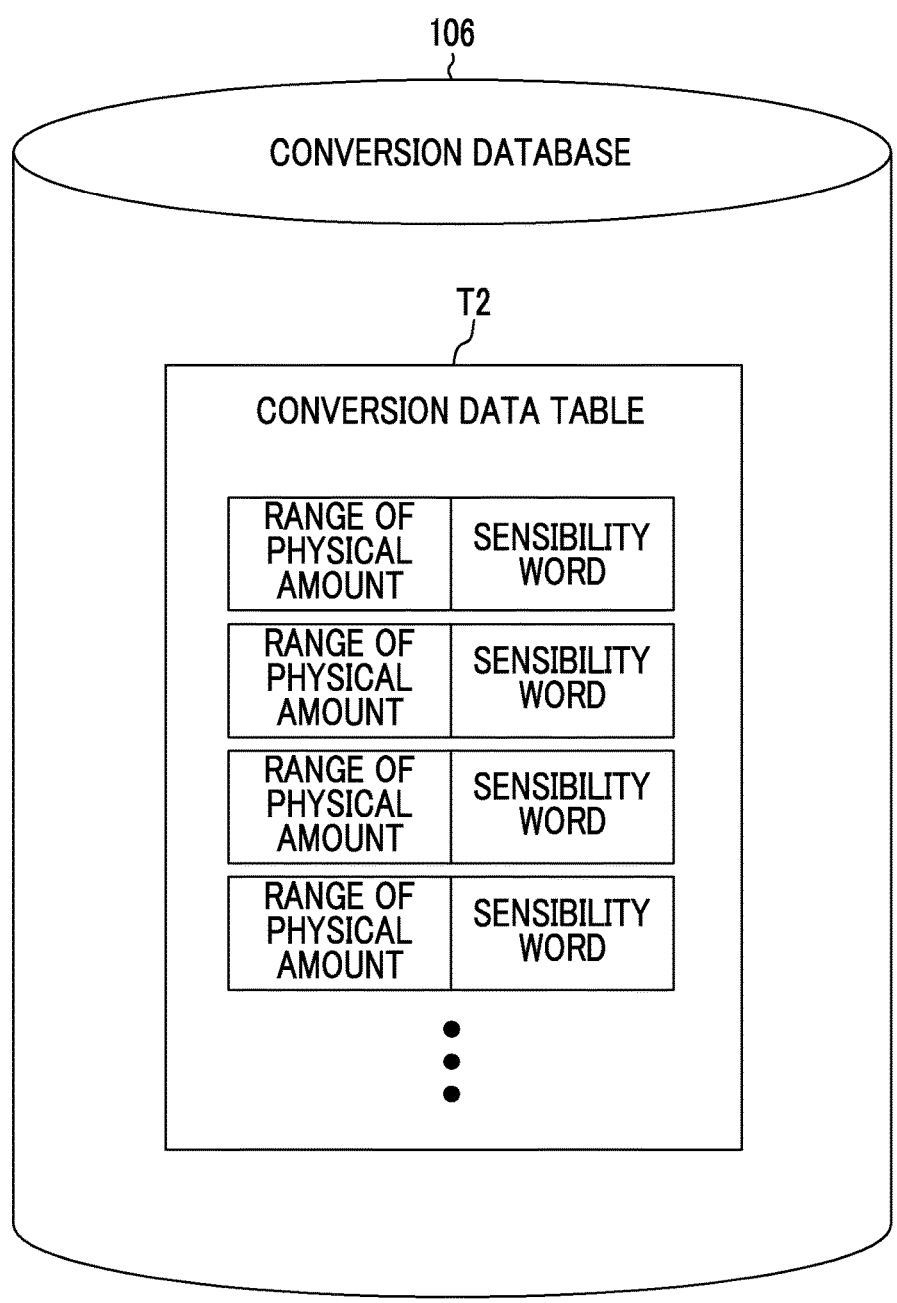
FIG. 11 is a diagram illustrating another example of a configuration of a conversion database.

FIGS. 10 and 11 illustrate examples of the conversion database 106.

The conversion database 106 of FIG. 10 includes a conversion data table T1 showing a correspondence relationship between the range of the physical amount and the information indicating the block. As the information indicating the block, for example, the block identification information and the range information in the sensibility space of each block stored in the sensibility space database 104 may be used.

The conversion database 106 of FIG. 11 includes a conversion data table T2 showing a correspondence relationship between the range of the physical amount and the sensibility word. That is, the conversion data table T2 is a data table using the sensibility word as "the information indicating the block" in the conversion data table T1 of FIG. 10. For example, in a case in which a sensibility word (a representative sensibility word) representative of each block in an aspect of a large block illustrated in FIG. 5 is determined or in the case of an aspect of a small block illustrated in FIG. 6, a conversion database in FIG. 11 can be used.

<Main Process>

Figure 12:
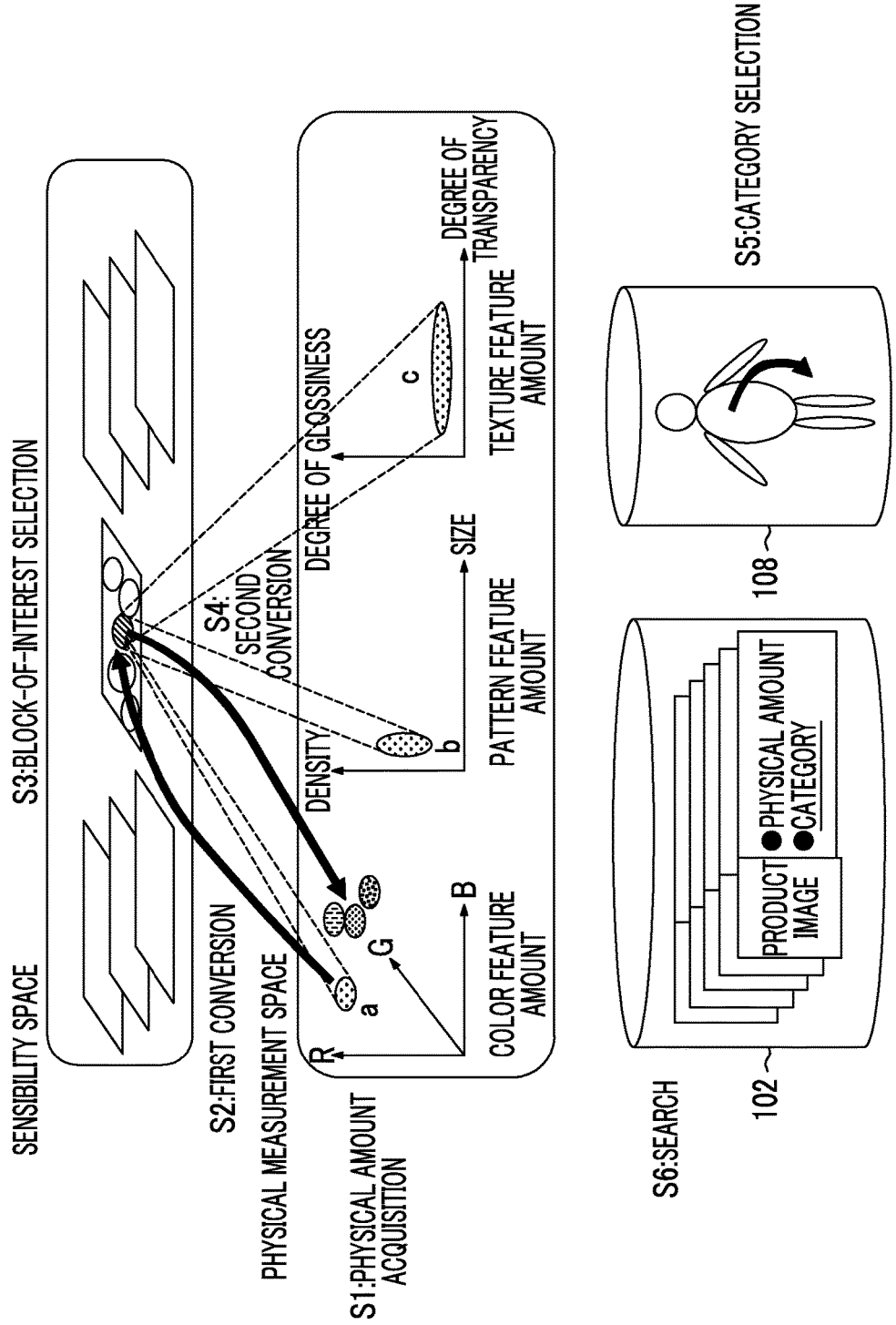
FIG. 12 is a first illustrative diagram used for description of a flow of a main process.

A main process illustrated in FIG. 12 corresponds to a case in which a product image of which the impression gotten by a person is substantially the same.

In FIG. 12, the product search apparatus 100 of the present invention performs the following steps S1 to S6.

In step S1 (physical amount acquisition process), the physical amount acquisition unit 116 acquires the physical amount of the specific product image from the product database 102. Here, the image of the specific product is a product image which serves as a reference for product image search, and there is an aspect in which the image is indicated and input by the user at the client apparatus 11 and an aspect in which the image is determined at the server apparatus 10. One of the aspects may be selected through a switching operation by the user. A color feature amount a represented three-dimensionally by R, G, and B, a pattern feature amount b represented two-dimensionally by a size and a density, and a texture feature amount c represented two-dimensionally by a degree of transparency and a degree of glossiness are illustrated in FIG. 12, but the present invention is not limited to the feature amounts. For example, the shape feature value may be used as the physical feature amount.

In step S2 (first conversion process), the first conversion unit 118 converts the physical amount of the image of the specific product acquired in step S1 into information indicating a specific-product sensibility block corresponding to the image of the specific product among the plurality of blocks in the sensibility space using the conversion database 106. For example, the first conversion unit 118 converts the physical amount into block identification information of the specific-product sensibility block or a sensibility word representative of the specific-product sensibility block as the information indicating the specific-product sensibility block.

In step S3 (block-of-interest selection process), the block-of-interest selection unit 120 selects a specific-product sensibility block as the block of interest which is of interested for search.

In step S4 (second conversion process), the second conversion unit 122 converts the information indicating the block of interest of the sensibility space into the information indicating the range of the physical amount of the product image corresponding to the block of interest using the conversion database 106. For example, the second conversion unit 122 converts the block identification information (or the sensibility word) of the block of interest into range information of the physical amount (for example, information indicating an upper limit and a lower limit of the physical amount). In a case in which a representative sensibility word is determined for each block or in a case in which the block and the sensibility word are in a one-to-one correspondence, the second conversion unit 122 converts the sensibility word of the block of interest into the range information of the physical amount.

In step S5 (category selection process), the category selection unit 123 selects a search target category from among the plurality of categories stored in the product database 102 based on the category of the specific product.

In step S6 (search process), the search unit 124 searches for a product image corresponding to the search target category and the block of interest from the product database 102 based on the search target category selected in step S5 and the information indicating the range of the physical amount obtained in step S4.

Figure 13:
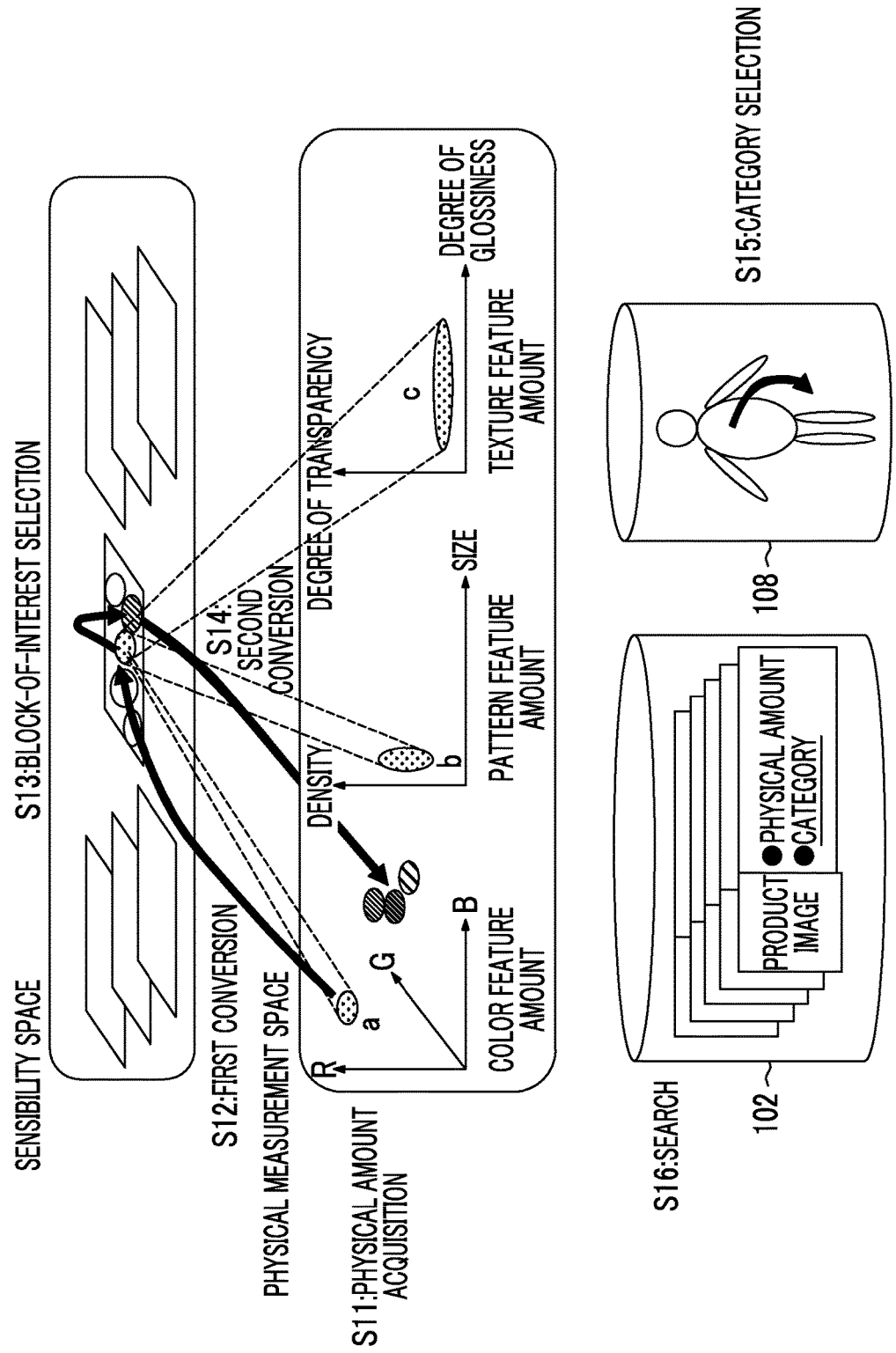
FIG. 13 is a second illustrative diagram used for description of a flow of a main process.

A main process illustrated in FIG. 13 corresponds to a case of searching for a product image of which the impression gotten by a person is different.

Steps S11 and S12 are the same as steps S1 and S2 in FIG. 12.

In step S13 (block-of-interest selection process), the block-of-interest selection unit 120 selects a block different from the specific-product sensibility block from among the plurality of blocks in the sensibility space based on the information indicating the specific-product sensibility block obtained in step S2 using the sensibility space database 104. That is, in the sensibility space, a movement is performed from the specific-product sensibility block that is a block corresponding to the specific product image to a block of interest that is a block corresponding to a product image dissimilar to the specific product image and to which the user is expected to be highly likely to pay attention.

Steps S14 to S16 are the same as steps S4 to S6 in FIG. 12.

<Category Selection>

Various aspects of category selection by the category selection unit 123 will be described.

In a first aspect, the category selection unit 123 selects the same category as the specific product as the search target category. For example, in a case in which the category of the specific product is "sweater", the category selection unit 123 selects "sweater" as the search target category. In the first aspect, the category selection unit 123 can select the search target category even without reference to the category-to-body position database 108.

Figure 14:
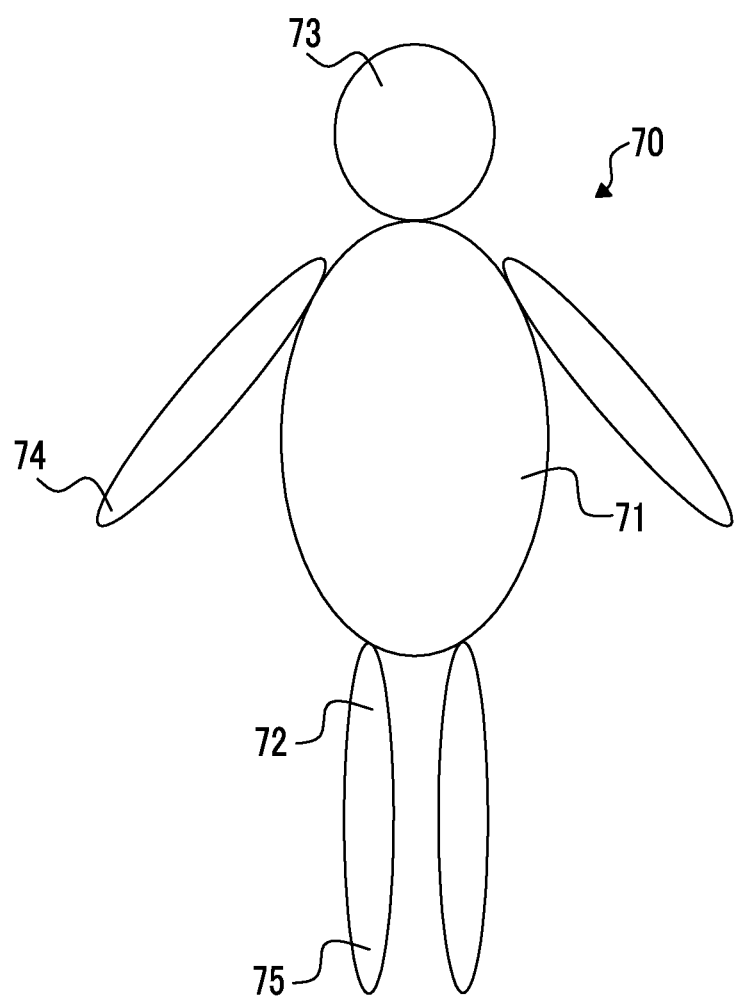
FIG. 14 is an illustrative diagram used in description of a body position.

In a second aspect, the category selection unit 123 selects the category of the product of which the wearing position on the body is the same as that of the specific product, as the search target category. For example, in a human body 70 of FIG. 14, if the body position of the category of the specific product is a body portion 71, the category selection unit 123 selects a category of which the wearing position is the body portion 71 as the search target category. Similarly, if the body positions of the category of the specific product are a leg 72, a head 73, a hand 74, and a foot 75, the category selection unit 123 selects a category of which the wearing positions are the leg 72, the head 73, the hand 74, and the foot 75, as the search target category. In the second aspect, the category selection unit 123 selects the search target category based on the body position of the category of the specific product using the category-to-body position database 108 of FIG. 4.

In a third aspect, the category selection unit 123 selects a category of a product of which the wearing position on the body is adjacent to that of the specific product, a category of a product of which the wearing position on the body is close to that of the specific product, or a category of a product of which the wearing position on the body partially overlaps that of the specific product, as a search target category. Here, adjacent refers to adjacent between products when the product is worn. Close refers to close between products when the product is worn. "Close" includes a case of non-contact between products rather than "adjacent". Partially overlapping refers to there being an overlapping portion between products when the product is worn. In the third aspect, the category selection unit 123 selects the search target category based on the body position of the category of the specific product using the category-to-body position database 108 of FIG. 4.

The category selection using the category-to-body position database 108 is not particularly limited to the second and third aspects. Information on a correspondence relationship between a combination of a plurality of categories and a combination of a plurality of body positions is stored in the category-to-body position database in advance and is referred to by the category selection unit 123, making it possible to cope with a combination of various categories and body positions.

<Client Apparatus>

Figure 15:
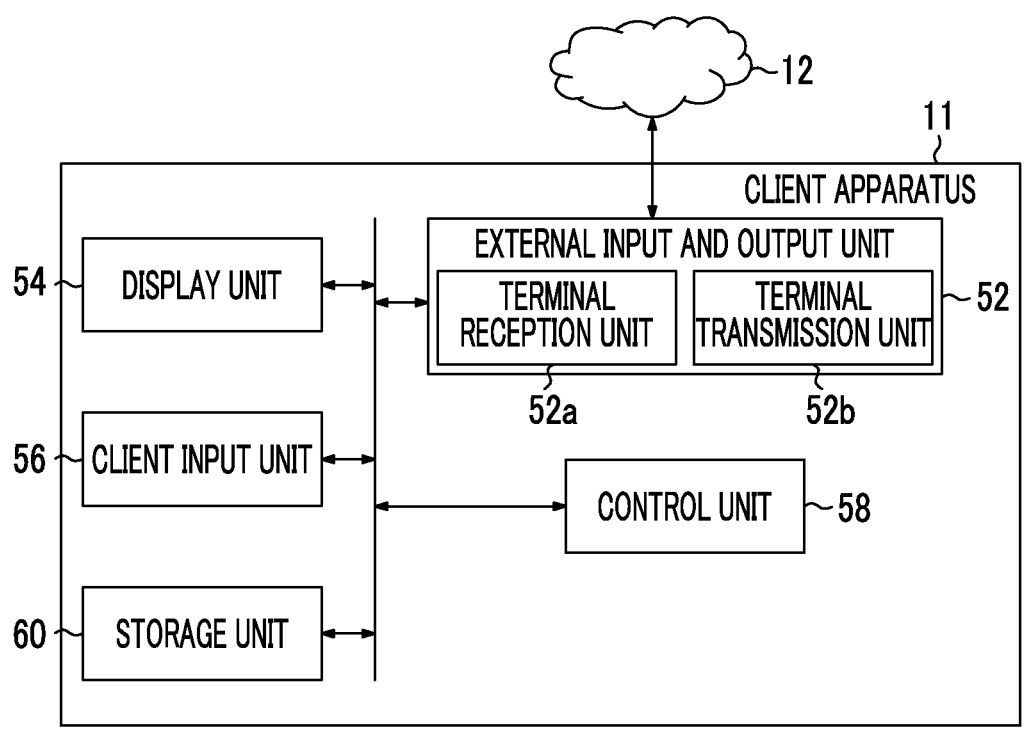
FIG. 15 is a block diagram illustrating an example of a configuration of a client apparatus.

FIG. 15 is a block diagram illustrating an example of a configuration of the client apparatus 11. The client apparatus 11 of this example includes an external input and output unit 52 including a terminal reception unit 52a that receives information transmitted from the output unit 112b of the server apparatus 10 and a terminal transmission unit 52b that transmits and outputs information which is received by the input unit 112a of the server apparatus 10, a display unit 54 capable of displaying an image, a client input unit 56 that receives a user input, a control unit 58 that controls each unit of the client apparatus 11, and a storage unit 60 that stores various types of information.

The client input unit 56 receives an input of information indicating a specific product, or information indicating an specific product image. The terminal transmission unit 52b transmits the information received by the client input unit 56 to the server apparatus 10. The terminal reception unit 52a receives a product image as a search result that is transmitted from the server apparatus 10 over the network 12.

The client apparatus 11 is not particularly limited to the example of a configuration illustrated in FIG. 15. The client apparatus 11 may have a communication function of connecting to the network 12 and performing communication, a display function of displaying an image, and a user input function of receiving a user input. For example, various types of user terminals such as a mobile terminal, a personal computer, or a tablet terminal can be used as the client apparatus 11.

Next, various aspects of the block-of-interest selection in a first embodiment to a third embodiment will be described.

First Embodiment

The block-of-interest selection unit 120 of the first embodiment selects at least one type of sensibility block from among an adjacent sensibility block which is a block adjacent to the specific-product sensibility block, a close sensibility block which is a block close to the specific-product sensibility block, or an overlapping sensibility block which is a block which partially overlaps the specific-product sensibility block in the sensibility space, as a block of interest which is of interest for product image search.

Further, the adjacent sensibility block is a sensibility block of which the boundary is in contact with the specific-product sensibility block among the plurality of sensibility blocks in the sensibility space. The close sensibility block is a sensibility block close to the specific-product sensibility block among the plurality of sensibility blocks in the sensibility space, and includes a sensibility block of which the boundary does not come into contact with the specific-product sensibility block, other than the adjacent sensibility block.

First, a case in which the close sensibility block is selected as the block of interest will be described. This example is a case in which both of a large block in which sensibility words are grouped and a small block of each sensibility word are used.

Figure 16:
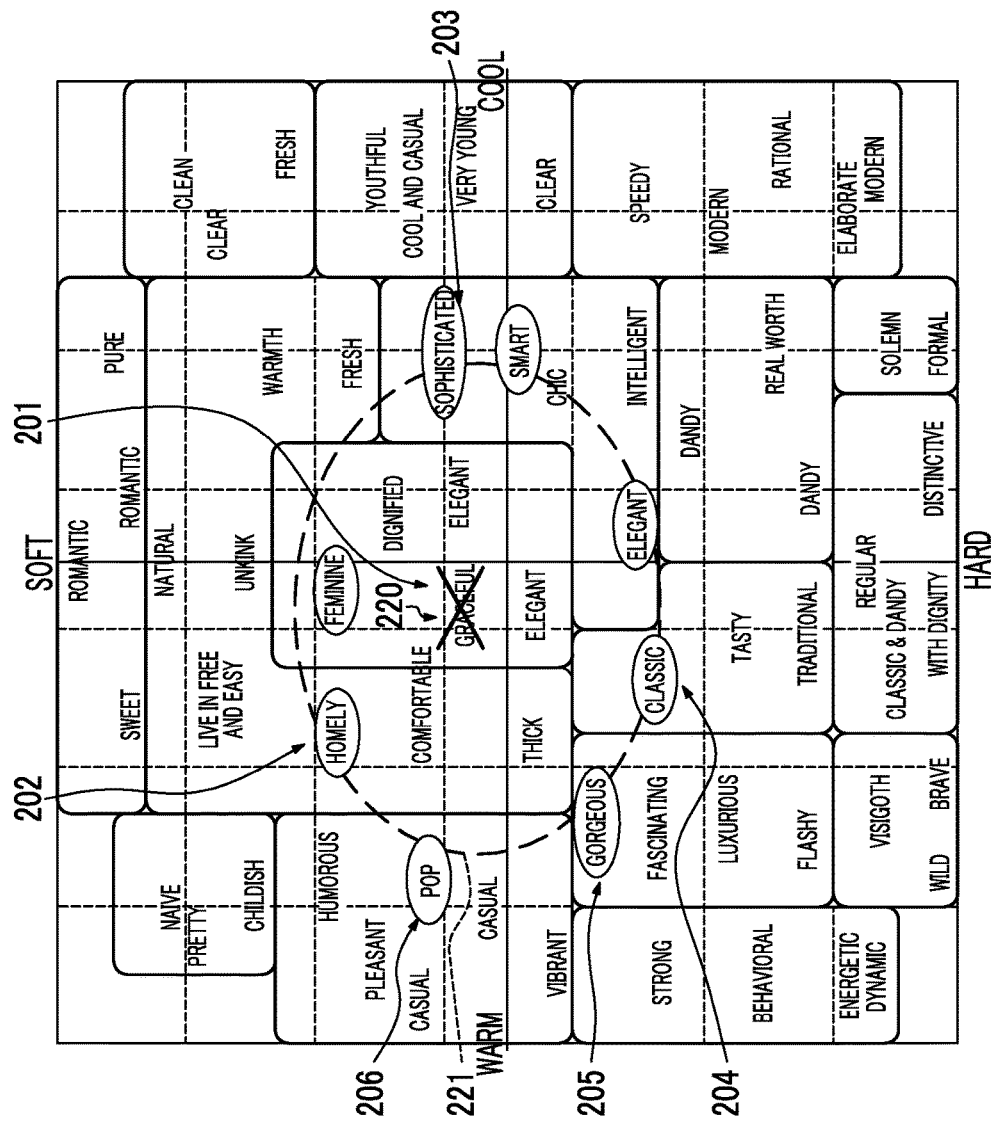
FIG. 16 is an illustrative diagram used in description of an example of selection of a block of interest in the first embodiment.

In FIG. 16, in a case in which a coordinate position denoted with reference sign 220 is a coordinate position on the sensibility space corresponding to the physical amount of the specific product image (hereinafter referred to as a "specific-product sensibility space position"), sensibility blocks (for example, sensibility blocks denoted with reference signs 202 to 206) including a coordinate position of which a difference in the sensibility feature amount with the specific-product sensibility space position 220 is smaller than or equal to a threshold value are selected as the blocks of interest. Here, the coordinate position of the sensibility word corresponding to the physical amount of the specific product image is used as the specific-product sensibility space position.

A determination as to whether or not each sensibility block is the close sensibility block will be described. For example, on the basis of a circle 221 (here, the circle includes an ellipse) of which a center point is the specific-product sensibility space position 220 in the sensibility space, sensibility blocks having a portion overlapping the circle 221 and sensibility blocks present inside the circle 221, that is, sensibility blocks 202 to 206 other than the specific-product sensibility block 201 are determined as close sensibility blocks.

In a case in which the close sensibility block as a block of interest other than the specific-product sensibility block 201 as described above is selected as the block of interest which is of interest for search of the product image, the number of product images in an image search result may be inappropriately large. For example, in a case in which the total number of product images is large, the number of product images in the image search result tends to be also large. That is, in a case in which the product images are displayed as the search result on the client apparatus 11, the number of products recommended to the user becomes inappropriately large. Therefore, by the block-of-interest selection unit 120 switching a diameter of the circle 221 according to the number of product images, a range of the close sensibility blocks in the sensibility space may be changed.

Next, a case in which only the adjacent sensibility block among the close sensibility blocks is selected as a block of interest will be described.

For example, in a case in which the sensibility block denoted with reference sign B7 is the specific-product sensibility block in the sensibility space in FIG. 5, sensibility blocks denoted with reference signs B3, B6, B8, and B11 of which the boundary is adjacent to the specific-product sensibility block B7 are adjacent sensibility blocks.

Further, in FIG. 17, in a case in which a coordinate position denoted with reference sign 220 is a coordinate position (hereinafter referred to as "specific-product sensibility space position") on the sensibility space corresponding to the physical amount of the specific product image, a sensibility block denoted with reference sign 201 including the specific-product sensibility space position is the specific-product sensibility block, and sensibility blocks denoted with reference signs 202 to 204 of which boundaries are in contact with the specific-product sensibility block 201 are adjacent sensibility blocks. That is, in FIG. 17, the sensibility blocks included in an area within a dotted line denoted with reference sign 230 are selected as the blocks of interest. By this selection, for example, sensibility word "homely" in the adjacent sensibility block denoted with reference sign 202 and, for example, sensibility words "sophisticated", "smart", and "gracious" of the adjacent sensibility block denoted with reference sign 203 are specified as the sensibility words corresponding to the product image which is a search target, in addition to, for example, sensibility word "feminine" in the specific-product sensibility block 201.

In a case in which only the adjacent sensibility blocks as blocks of interest other than the specific-product sensibility block 201 are selected as blocks of interest which are of interest for search of the product image as described above, the number of product images in the image search result may be inappropriately small. For example, in a case in which the total number of product images is small, the number of product images in the image search result tends to be also small. That is, when the product images are displayed as the search result on the client apparatus 11, the number of products recommended to the user becomes inappropriately small. Therefore, the block-of-interest selection unit 120 may determine whether the close sensibility block is set as the block of interest as described with reference to FIG. 16 or the adjacent sensibility block is set as the block of interest as described with reference to FIG. 17 according to the number of product images.

Figure 17:
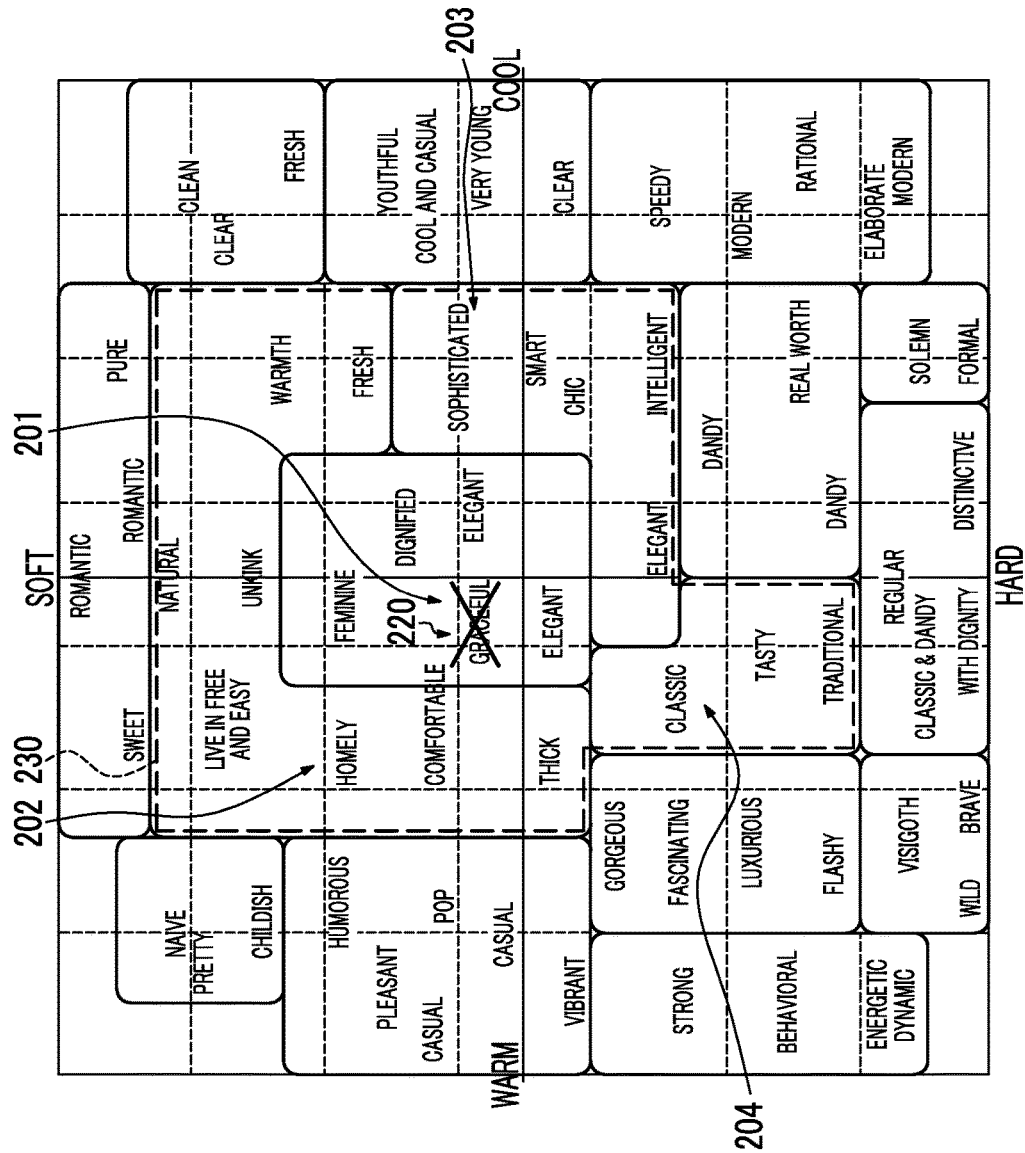
FIG. 17 is an illustrative diagram used in description of another example of selection of a block of interest in the first embodiment.

Although the sensibility blocks are partitioned so that the sensibility blocks do not overlap each other in the sensibility space illustrated in FIGS. 5, 16 and 17, the sensibility blocks may be allowed to partially overlap and a plurality of sensibility blocks may be partitioned in the sensibility space. In the case of the partition in which the sensibility blocks are allowed to overlap, the block-of-interest selection unit 120 may select a sensibility block ("overlapping sensibility block") partially overlapping the designated product sensibility block, as a block of interest, in addition to the adjacent sensibility block and/or the close sensibility block.

Figure 18:
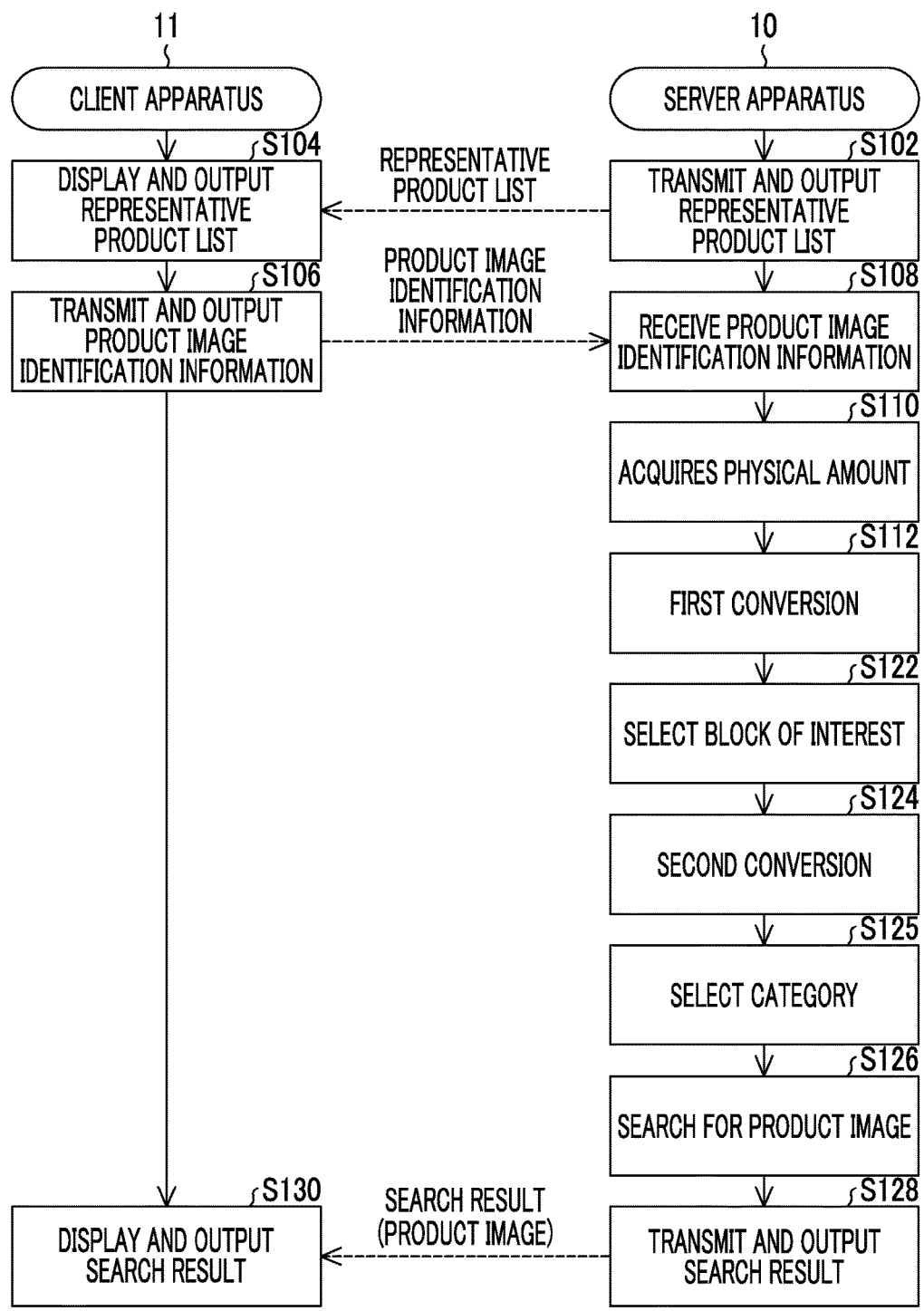
FIG. 18 is a diagram illustrating a flow of a process of the entire product search system in the first embodiment.

FIG. 18 is a flowchart illustrating a flow of a product search process in the product search system 1 illustrated in FIG. 1. In this example, search is performed using an image of a product specified by the user at the client apparatus 11 as a specific product image.

First, the screen information generation unit 114 of the server apparatus 10 generates a representative product list as screen information, and the output unit 112b of the server apparatus 10 transmits and outputs the representative product list to the client apparatus 11 (step S102). The representative product list includes reduced images of a plurality of representative products. Further, product image identification information for each representative product is added to the representative product list.

If the terminal reception unit 52a of the client apparatus 11 receives the representative product list, the representative product list is displayed and output on the display unit 54 of the client apparatus 11 under the control of the control unit 58 of the client apparatus 11 (step S104).

The client input unit 56 of the client apparatus 11 receives the specifying of a product from the user, and the terminal transmission unit 52b of the client apparatus 11 transmits and outputs product image identification information corresponding to the product specified by the user to the server apparatus 10 (step S106).

If the input unit 112a of the server apparatus 10 receives the product image identification information (step S108), the physical amount acquisition unit 116 of the server apparatus 10 acquires the physical amount of the image of the specific product from the product database 102 based on the product image identification information (step S110).

Then, the first conversion unit 118 of the server apparatus 10 converts the acquired physical amount of the image of the specific product into information indicating the specific-product sensibility block which is a block corresponding to the image of the specific product (step S112). The first conversion unit 118 of this embodiment acquires the sensibility space information (for example, block identification information and/or sensibility word) corresponding to the specific-product sensibility block from the conversion database 106 based on the physical amount of the image.

Then, the block-of-interest selection unit 120 of the server apparatus 10 selects the block of interest using the sensibility space database 104 (step S122).

For example, in the sensibility space illustrated in FIG. 16, in a case in which the sensibility block denoted with reference sign 201 is the specific-product sensibility block and the sensibility blocks indicated by reference signs 202 to 206 are close sensibility blocks, blocks indicated by reference signs 202 to 206 are selected as blocks of interest. In a case in which a product image corresponding to the specific-product sensibility block denoted with reference sign 201 is not displayed on the client apparatus 11, the block-of-interest selection unit 120 can include the specified-product sensibility block denoted with reference sign 201 in the blocks of interest.

Then, the second conversion unit 122 of the server apparatus 10 converts the information indicating the block of interest into the information indicating the range of the physical amount of the product image corresponding to the block of interest (hereinafter, "physical amount range information") (step S124).

For example, block identification information of the block of interest is used as the information indicating the block of interest. In the case in which the conversion data table of FIG. 11 is used, the sensibility word corresponding to the block of interest is used.

In the case of the product database 102 illustrated in FIG. 3, the physical amount range information includes any one of a range (an upper limit value and a lower limit value) of color feature amount, a range (an upper limit value and a lower limit value) of shape feature value, a range (an upper limit value and a lower limit value) of pattern feature amount, and a range (an upper limit value and a lower limit value) of texture feature amount in product images which are search targets. The physical amount range information may be a combination of two or more of the color feature amount, the shape feature amount, the pattern feature amount, and the texture feature amount.

Then, the category selection unit 123 of the server apparatus 10 selects a search target category from among the plurality of categories registered in the product database 102 based on the category of the specific product (step S125).

Then, the search unit 124 of the server apparatus 10 searches for the product image corresponding to the block of interest from the product database 102 based on the search target category selected by the category selection unit 123 and the physical amount range information obtained by the second conversion unit 122 (step S126).

Then, the output unit 112b of the server apparatus 10 transmits and outputs a search result of the search unit 124 to the client apparatus 11 (step S128).

When the terminal reception unit 52a of the client apparatus 11 receives the search result, the search result is displayed and output on the display unit 54 of the client apparatus 11 under the control of the control unit 58 of the client apparatus 11 (step S130). The search result includes a product image corresponding to the block of interest.

The search result is not limited in a case in which all the product images are displayed at one time in the client apparatus 11. In a case in which a plurality of product images are searched for, a plurality of reduced images of the plurality of product images may be transmitted and output to the client apparatus 11 and displayed and output on the client apparatus 11, and if the user selects the reduced image at the client apparatus 11, the entire image of the product image corresponding to the reduced image selected by the user may be transmitted and output to and displayed on the client apparatus 11.

Second Embodiment

A block-of-interest selection unit 120 of a second embodiment selects an opposite word sensibility block that is a block including an opposite sensibility word that is a sensibility word having a meaning opposite to a specific-product sensibility word that is a sensibility word corresponding to an image of a specific product, as a block of interest. The specific-product sensibility word is a word indicating an impression that a person observing the image of the specific product gets from the image.

For example, in the sensibility space in FIG. 5, it is assumed that a sensibility block denoted with reference sign B9 is a specific-product sensibility block, and WORD19 is a specific-product sensibility word. In a case in which opposite sensibility words with a meaning opposite to this specific-product sensibility word WORD19 are two words including WORD11 and WORD25, two blocks including a sensibility block denoted with reference sign B6 to which WORD11 belongs and a sensibility block denoted with reference sign B12 to which WORD25 belongs are opposite-word sensibility blocks.

Figure 19:
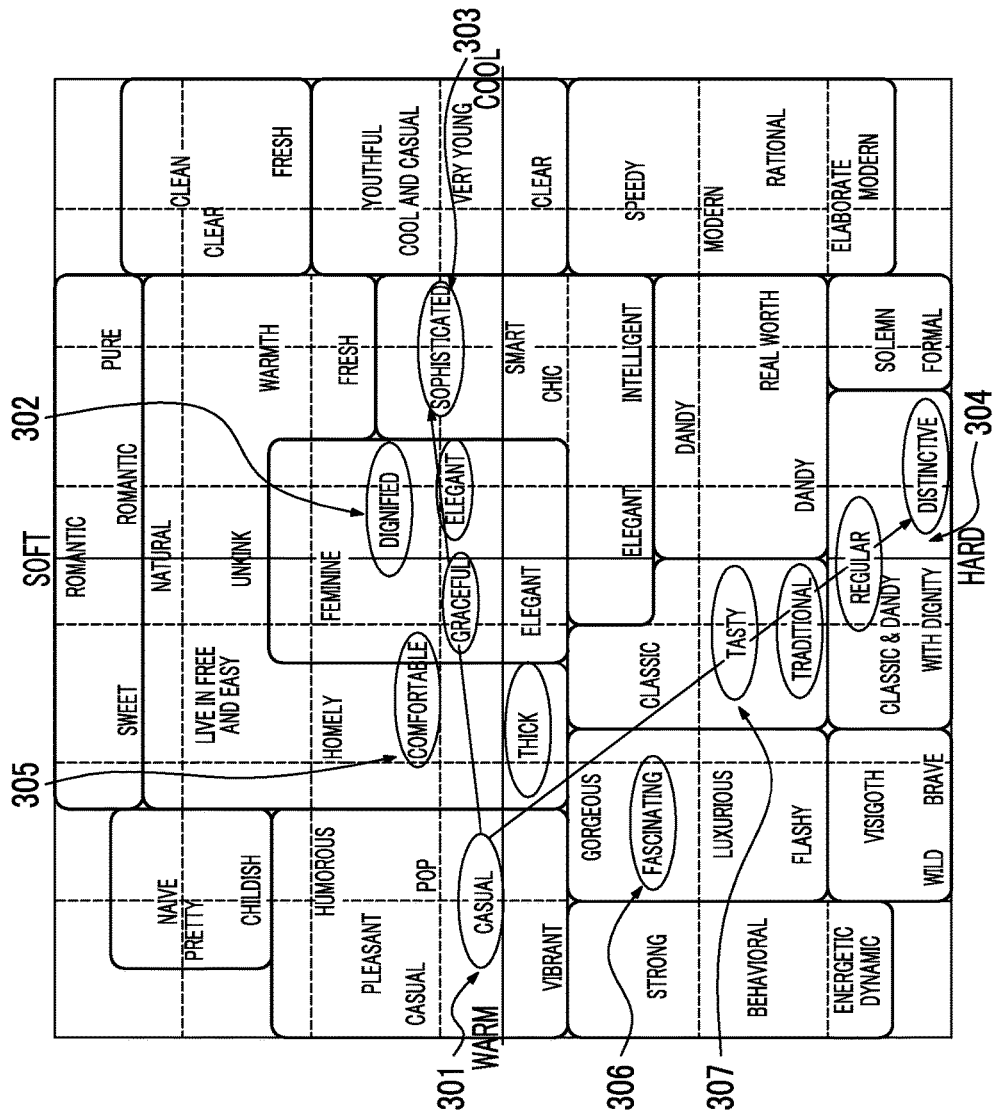
FIG. 19 is an illustrative diagram used in description of an example of selection of a block of interest in a second embodiment.

In the sensibility space illustrated in FIG. 19, in a case in which a sensibility block denoted with reference sign 301 is the specific-product sensibility block and "casual" is the specific-product sensibility word, the block-of-interest selection unit 120 selects an opposite sensibility word with a meaning opposite to "casual" that is the specific-product sensibility word from among the sensibility words arranged in the sensibility space based on the sensibility space database 104. For example, in a case in which three words including "dignified" belonging to a sensibility block denoted with reference sign 302, "sophisticated" belonging to a sensibility block denoted with reference sign 303, and "stately" belonging to a sensibility block denoted with reference sign 304 are stored as opposite sensibility words of "casual" in the sensibility space database 104, sensibility blocks denoted with reference signs 302, 303, and 304 are selected as blocks of interest.

Further, the block-of-interest selection unit 120 may select blocks (for example, reference signs 305 to 307) arranged between the specific-product sensibility block 301 and the opposite-word sensibility blocks 302 to 304 in the sensibility space, as blocks of interest.

The case in which the sensibility space illustrated in FIG. 7 is used has been described by way of example, the present invention is not particularly limited to such a case. A sensibility space illustrated in FIG. 8 may be used.

Third Embodiment

An external input and output unit 112 (corresponding to one form of a user designation information reception unit) of a third embodiment receives user designation information indicating at least one of a sensibility word designated by a user or a sensibility block designated by the user at the client apparatus 11 from the client apparatus 11 over the network 12. The block-of-interest selection unit 120 of the third embodiment selects a user-designated sensibility block that is a sensibility block corresponding to the sensibility word designated by the user or the sensibility block designated by the user, as a block of interest which is of interest for image search.

FIG. 20 is a flowchart illustrating a flow of an example of a product search process in the third embodiment. In FIG. 20, the server apparatus 10 has the configuration illustrated in FIG. 2, and the client apparatus 11 has the configuration illustrated in FIG. 15.

Since steps S301 to S312 in FIG. 20 are the same as steps S102 to S112 illustrated in FIG. 18 and have already been described in the first embodiment, description thereof will be omitted in the this embodiment.

In this embodiment, the output unit 112b of the server apparatus 10 transmits and outputs sensibility space selection screen information to the client apparatus 11 (step S314). The sensibility space selection screen information is screen information for causing the user to select one or a plurality of blocks from among the plurality of blocks in the sensibility space at the client apparatus 11.

If the sensibility space selection screen information is received by the external input and output unit 52 of the client apparatus 11, the sensibility space selection screen is displayed and output on the display unit 54 of the client apparatus 11 under the control of the control unit 58 of the client apparatus 11 (step S316).

The client input unit 56 of the client apparatus 11 receives the selection of the sensibility word or the block from the user, and the terminal transmission unit 52b of the client apparatus 11 transmits and outputs the user designation information indicating the sensibility word or the block selected by the user to the server apparatus 10 (step S318).

First, there is an aspect in which the user is caused to designate the sensibility word so as to designate the block. For example, a list of sensibility words is displayed on the display unit 54 of the client apparatus 11, and the sensibility word in the sensibility word list selected and input by the user from the client input unit 56 is detected. Second, there is an aspect in which the user is caused to designate a block so as to designate the block. For example, the sensibility space illustrated in FIG. 6 is displayed on the display unit 54 of the client apparatus 11, and a position in the sensibility space indicated and input by the user from the client input unit 56 is detected.

If the input unit 112a of the server apparatus 10 receives the user designation information (step S320), the block-of-interest selection unit 120 of the server apparatus 10 selects the block corresponding to the sensibility word designated by the user or the user-designated sensibility block which is the block designated by the user, as the block of interest, based on the user designation information (step S322).

The block-of-interest selection unit 120 of this example selects a block arranged between the specific-product sensibility block and the user-designated sensibility block in the sensibility space, as the block of interest.

For example, in a case in which a sensibility block indicated by reference sign 401 is a specific-product sensibility block, and a sensibility block indicated by reference sign 402 is a user-designated sensibility block in the sensibility space illustrated in FIG. 21, for example, blocks respectively indicated by reference signs 403 and 404 arranged between the specific-product sensibility block 401 and the user-designated sensibility block 402 are selected as blocks of interest.

A width (W in FIG. 21) of an axis connecting the specific-product sensibility block 401 to the user-designated sensibility block 402 may be changed according to the number of product images (or the number of products). This width W of the axis indicates a width in which a block between the specific-product sensibility block 401 and the user-designated sensibility block 402 in the sensibility space is selected as a block of interest. Specifically, the width W decreases as the number of product images increases, and the width W increases as the number of product images decreases. Here, the "number of product images" may be the number of product images in the entire sensibility space or may be the number of product images corresponding to a block selected in a case in which the width W is a defined value.

Since steps S324 to S330 in FIG. 20 are the same as steps S124 to S130 illustrated in FIG. 18 and have already been described in the first embodiment, description thereof will be omitted in this embodiment.

While the case in which the sensibility space illustrated in FIG. 7 is used has been described by way of example, the present invention is not particularly limited to such a case, and the sensibility space illustrated in FIG. 8 may be used.

Fourth Embodiment

A block-of-interest selection unit 120 in a fourth embodiment selects a block arranged on a curve connecting three blocks including a first sensibility word block and a second sensibility word block, which are blocks respectively corresponding to a first sensibility word and a second sensibility word with opposite meanings, and a specific-product sensibility block, as a block of interest.

FIG. 22 is an illustrative diagram of this embodiment using the sensibility space in FIG. 8. In FIG. 22, a block denoted with reference sign 501 and a block denoted with reference sign 502 form a set having sensibility words with opposite meanings, and a block denoted with reference sign 503 is the specific-product sensibility block.

The block-of-interest selection unit 120 of this embodiment selects blocks denoted with reference signs 501 to 513 arranged on a curve connecting a block denoted with reference sign 501 (corresponding to the first sensibility word block), a specific-product sensibility block 503, and a block denoted with reference sign 502 (corresponding to the second sensibility word block), as blocks of interest.

<Configuration of Server Apparatus>

In FIG. 23, the server apparatus 10 includes an image analysis server 14, a database server 15, a mail server 16, and a WEB server 17.

The image analysis server 14 measures the physical amount of each product image by analyzing the product image obtained by imaging an outer appearance of the product through image processing. The physical amount of the product image measured by the image analysis server 14 is transmitted to and stored in the database server 15 corresponding to one form of the product database 102. The measured physical amount of the product image measured by the image analysis server 14 of this example includes a color feature amount, a shape feature amount, a pattern feature value, and a texture feature amount.

The mail server 16 performs communication based on e-mail with the client apparatus 11 over the network 12 and performs reception and confirmation of a product order.

The WEB server 17 performs interactive communication with the client apparatus 11 over the network 12, receives a designation of the specific product from the client apparatus 11, and transmits and outputs a search result to the client apparatus 11.

In the server apparatus 10 illustrated in FIG. 2, for example, the respective units (reference signs 104 to 124) other than the product database 102 can mainly be configured of the WEB server 17.

A country in the world where servers denoted with reference signs 14 to 17 are arranged is not particularly limited. For example, the respective servers 14 to 17 may be arranged in countries A to D, as illustrated in FIG. 24. Further, client apparatus 11 may be connected to a network 12 in country E where the servers 14 to 17 are not arranged.

The present invention is not limited to the examples described in this specification or the examples illustrated in the drawings, and it is understood that various design modifications or improvements may be performed without departing from the scope of the present invention.

EXPLANATION OF REFERENCES

10: server apparatus
11: client apparatus
12: network
100: product search apparatus
102: product database
104: sensibility space database
106: conversion database
108: category-to-body position database
112: external input and output unit of server apparatus
114: screen information generation unit
116: physical amount acquisition unit
118: first conversion unit
120: block-of-interest selection unit
122: second conversion unit
123: category selection unit
124: search unit

What is claimed is:

1. A product search apparatus using a product database for storing a plurality of images corresponding to a plurality of respective products, a physical amount of the images of the products, and a category of the products in association with one another, the product search apparatus comprising:
  a processor configured as:
    a physical amount acquisition unit that acquires a physical amount of an image of a specific product from the product database;
    a first conversion unit that converts the acquired physical amount of the image of the specific product into information indicating a specific-product sensibility block that is a block corresponding to the image of the specific product among a plurality of blocks in a sensibility space in which a plurality of sensibility words representing sensibility of a person are arranged;
    a second conversion unit that converts information indicating a block of interest selected from among the plurality of blocks in the sensibility space based on information indicating the specific-product sensibility block obtained by the first conversion unit into information indicating a range of a physical amount of an image corresponding to the block of interest;
    a category selection unit that selects a search target category from among a plurality of categories stored in the product database based on the category of the specific product;
    a search unit that searches for an image corresponding to the search target category and the block of interest from the product database based on the search target category selected by the category selection unit and the information indicating the range of the physical amount obtained by the second conversion unit; and a block-of-interest selection unit that selects at least one of a block adjacent to the specific-product sensibility block, a block close to the specific-product sensibility block, or a block partially overlapping the specific-product sensibility block in the sensibility space, as the block of interest.

2. The product search apparatus according to claim 1, wherein the category selection unit selects the same category as that of the specific product as the search target category.

3. The product search apparatus according to claim 1, wherein the category selection unit selects a category of a product of which the wearing position on the body is the same as that of the specific product, as the search target category.

4. The product search apparatus according to claim 3, further comprising:
a category-to-body position database that stores category-to-body position information indicating a correspondence relationship between each category stored in the product database and a body position of a person,
wherein the category selection unit selects the search target category based on the category-to-body position information.

5. The product search apparatus according to claim 1, wherein the category selection unit selects a category of a product of which the wearing position on the body is adjacent to, close to, or partially overlapping that of the specific product, as the search target category.

6. The product search apparatus according to claim 1, wherein:
the block-of-interest selection unit selects, as the block of interest, at least one of:
the block adjacent to the specific-product sensibility block,
the block close to the specific-product sensibility block,
the block partially overlapping the specific-product sensibility block in the sensibility space, or
an opposite-word sensibility block that is a block including a sensibility word with an opposite meaning to the sensibility word corresponding to the image of the specific product.

7. The product search apparatus according to claim 6, wherein, when the block-of-interest selection unit selects the opposite-word sensibility block as the block of interest, the block-of-interest selection unit also selects a block arranged between the specific-product sensibility block and the opposite-word sensibility block in the sensibility space, as the block of interest.

8. The product search apparatus according to claim 1, further comprising:
a user designation information reception unit that receives information indicating at least one of a user-designated sensibility word or a user-designated block, and
wherein the block-of-interest selection unit selects, as the block of interest, at least one of:
the block adjacent to the specific-product sensibility block,
the block close to the specific-product sensibility block,
the block partially overlapping the specific-product sensibility block in the sensibility space, or
a block in the sensibility space corresponding to the user-designated sensibility word or a user-designated sensibility block that is a block in the sensibility space designated by the user.

9. The product search apparatus according to claim 8, wherein, when the block-of-interest selection unit selects, as the block of interest, the block in the sensibility space corresponding to the user-designated sensibility word or the user-designated sensibility block that is the block in the sensibility space designated by the user, the block-of-interest selection unit also selects a block arranged between the specific-product sensibility block and the user-designated sensibility block in the sensibility space, as the block of interest.

10. The product search apparatus according to claim 1, wherein:
the block-of-interest selection unit selects, as the block of interest, at least one of:
the block adjacent to the specific-product sensibility block,
the block close to the specific-product sensibility block,
the block partially overlapping the specific-product sensibility block in the sensibility space, or
a block arranged on a curve connecting three blocks including a first sensibility word block and a second sensibility word block, the first sensibility word block and the second sensibility word block being blocks respectively corresponding to a first sensibility word and a second sensibility word with opposite meanings, and a specific-product sensibility block.

11. The product search apparatus according to claim 1, further comprising:
a conversion database that stores conversion data indicating a correspondence relationship between information indicating respective blocks in the sensibility space and a range of the physical amount of the images of the plurality of products,
wherein the second conversion unit performs conversion based on the conversion data.

12. The product search apparatus according to claim 1, wherein the physical amount is at least one of a color feature amount, a shape feature amount, a pattern feature amount, or a texture feature amount.

13. The product search apparatus according to claim 1, further comprising:
an output unit that outputs an image searched for by the search unit.

14. A product search system comprising a server apparatus constituting the product search apparatus according to claim 1, and a client apparatus connected to the server apparatus over a network,
wherein the client apparatus includes
a display unit;
a client input unit that receives an input of information indicating the specific product or information indicating an image of the specific product;
a terminal transmission unit that transmits information received by the client input unit to the server apparatus;
a terminal reception unit that receives the search image that is transmitted from the server apparatus over the network; and
a control unit that displays the image received by the terminal reception unit on the display unit,
the physical amount acquisition unit of the server apparatus acquires the physical amount of the image of the specific product based on information transmitted from the client apparatus and information stored in the product database, and
the server apparatus transmits the search image to the client apparatus.

15. A product search method using a product database for storing a plurality of images corresponding to a plurality of respective products, a physical amount of the images of the products, and a category of the products in association with one another, the product search method comprising:

a process of acquiring a physical amount of an image of a specific product from the product database;

a first conversion process of converting the acquired physical amount of the image of the specific product into information indicating a specific-product sensibility block that is a block corresponding to the image of the specific product among a plurality of blocks in a sensibility space in which a plurality of sensibility words representing sensibility of a person are arranged;

a second conversion process of converting information indicating a block of interest selected from among the plurality of blocks in the sensibility space based on information indicating the specific-product sensibility block obtained in the first conversion process into information indicating a range of a physical amount of an image corresponding to the block of interest;

a category selection process of selecting a search target category from among a plurality of categories stored in the product database based on the category of the specific product;

a process of searching for an image corresponding to the search target category and the block of interest from the product database based on the search target category selected in the category selection process and the information indicating the range of the physical amount obtained in the second conversion process; and a process of selecting at least one of a block adjacent to the specific-product sensibility block, a block close to the specific-product sensibility block, or a block partially overlapping the specific-product sensibility block in the sensibility space, as the block of interest.

* * * * *